United States Patent [19]
Koslov

[11] Patent Number: 5,471,508
[45] Date of Patent: Nov. 28, 1995

[54] CARRIER RECOVERY SYSTEM USING ACQUISITION AND TRACKING MODES AND AUTOMATIC CARRIER-TO-NOISE ESTIMATION

[75] Inventor: Joshua L. Koslov, East Windsor, N.J.

[73] Assignee: Hitachi America, Ltd., Tarrytown, N.Y.

[21] Appl. No.: 109,742

[22] Filed: Aug. 20, 1993

[51] Int. Cl.$^6$ .................................................. H04L 27/06
[52] U.S. Cl. .................. 375/344; 375/261; 455/226.3
[58] Field of Search ............................... 375/39, 97, 119, 375/120, 261, 344, 373, 376; 455/226.1, 226.3

[56] References Cited

U.S. PATENT DOCUMENTS 4,227,152  10/1980  Godard et al. .......................... 375/39

OTHER PUBLICATIONS

N. K. Joblon, "Joint Blind Equalization, Carrier Recovery, and Timing Recovery for High–Order QAM Signal Constellations", *IEEE Transactions on Signal Processing*, vol. 40, No. 6, Jun. 1992, pp. 1383—1398.

N. K. Jablon, Joint Blind Equalization, Carrier Recovery, and Timing Recovery for 64–QAM and 128–QAM Signal Constellations, *Record of IEEE International Conference on Communications* (Boston, Mass.), Jun. 11–24, 1989 pp. 1043–1049.

A. Benveniste et al., "Blind Equalizers", *IEEE Transactions on Communications*, vol. COM–32, No. 8, Aug. 1984, pp. 871–883.

*Primary Examiner*—Stephen Chin
*Assistant Examiner*—William Luther
*Attorney, Agent, or Firm*—Peter L. Michaelson

[57] ABSTRACT

A carrier recovery system for use in illustratively a passband QAM (quadrature amplitude modulation) demodulator (10) and specifically such a system, including apparatus and accompanying methods, that employs separate acquisition and tracking modes and automatic carrier-to-noise estimation. In particular, a carrier recovery system (200) is operated in two modes: an acquisition mode to first attain an initial carrier lock, during which simplified reduced constellation slicing is used to determine a quadrant of each incoming symbol; and a tracking (or lock) mode, during which full slicing is used, to accurately track variations in frequency and phase that may occur to a carrier while the system remains locked. The mode changes based upon whether, e.g., the average error energy associated with fully sliced symbols is greater than or less than a pre-defined switching threshold value. The value of the switching threshold changes in a pre-determined manner with changes in noise content, particularly a carrier-to-noise ratio (CNR), of the received symbols. Two appropriately spaced switching threshold values, one for use in each mode, can be used to provide enhanced operational stability. An implementation of a QAM CNR estimator circuit (800) is also provided.

60 Claims, 20 Drawing Sheets

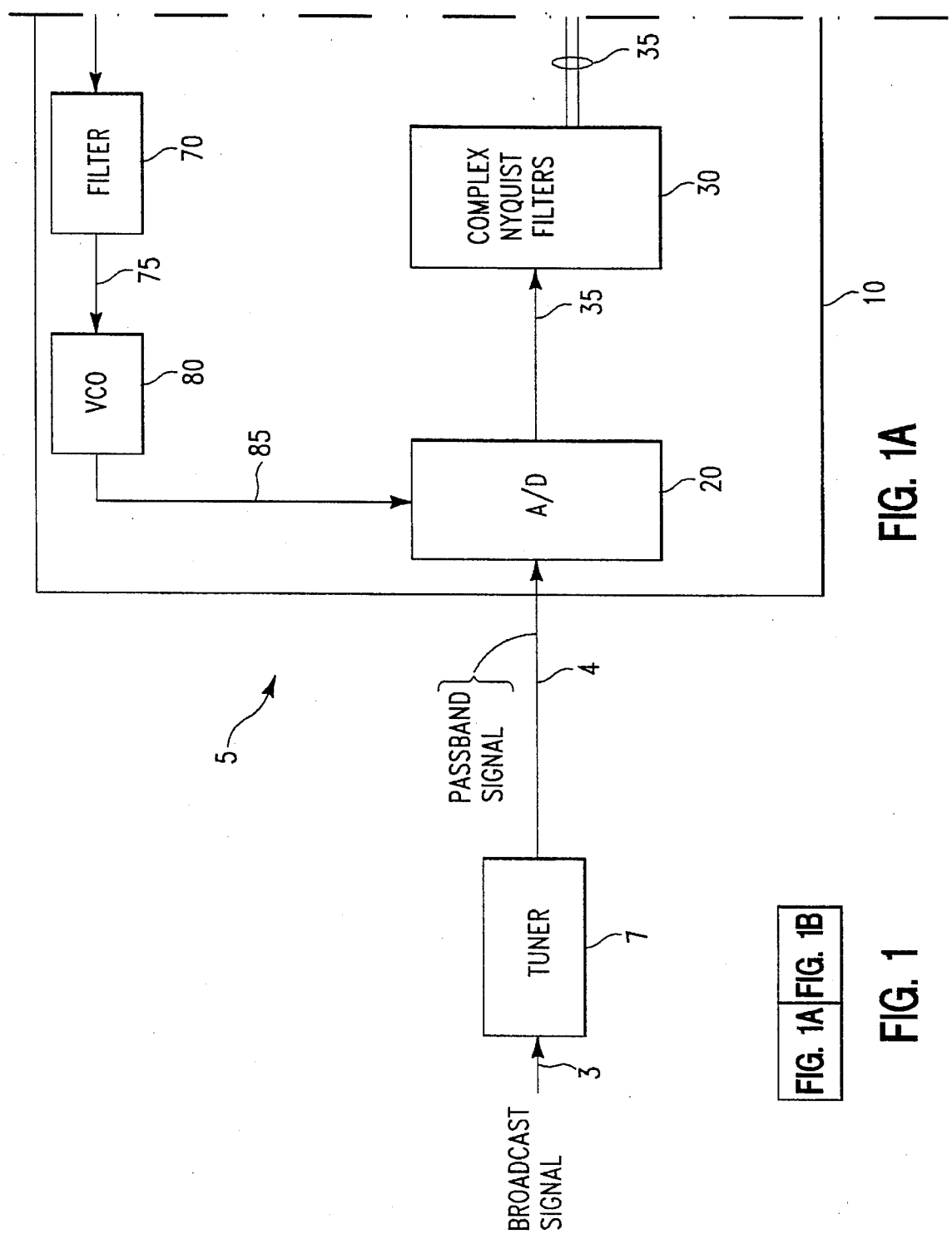

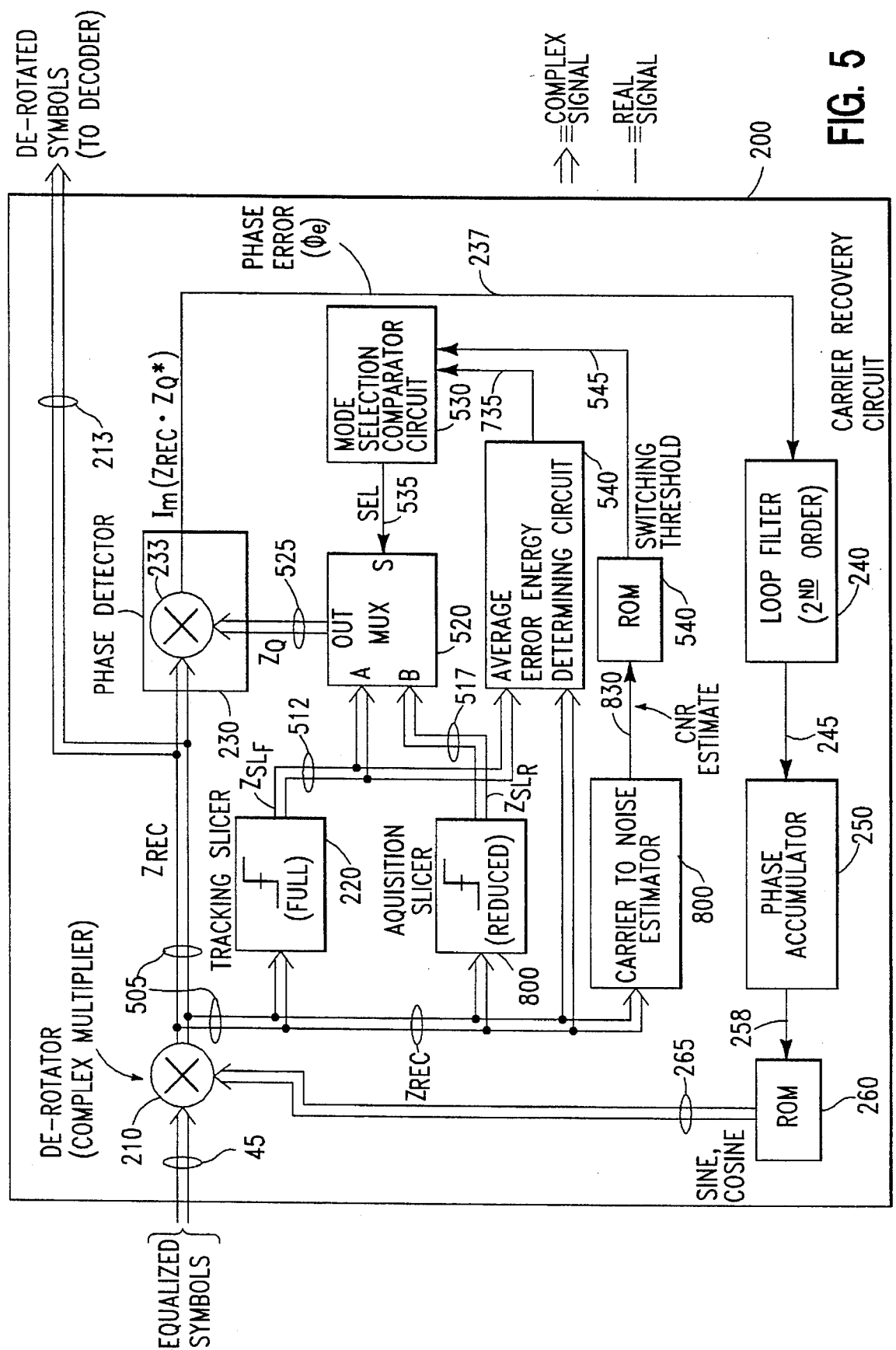

BINS FOR 16-QAM DETECTOR

BINS FOR 32-QAM DETECTOR

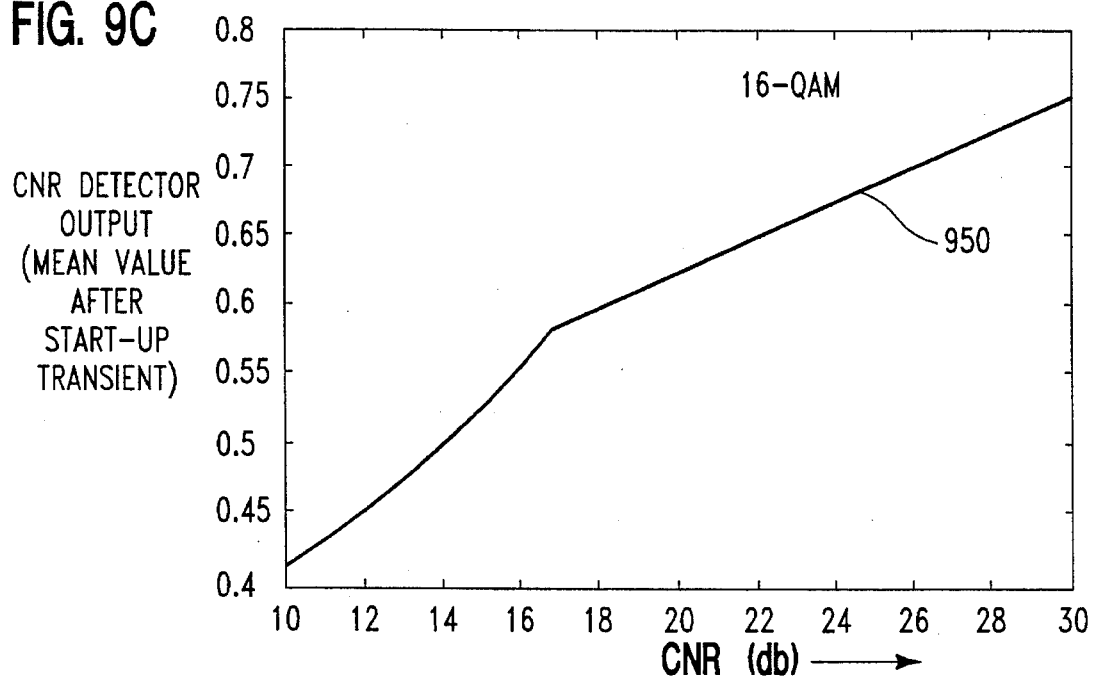
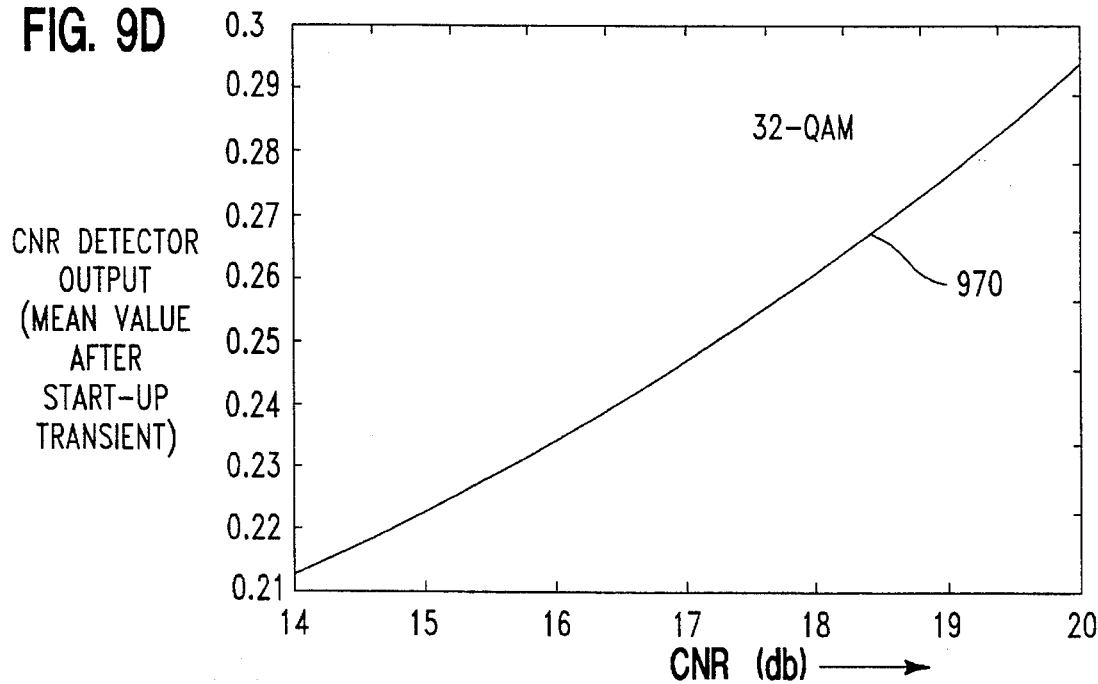

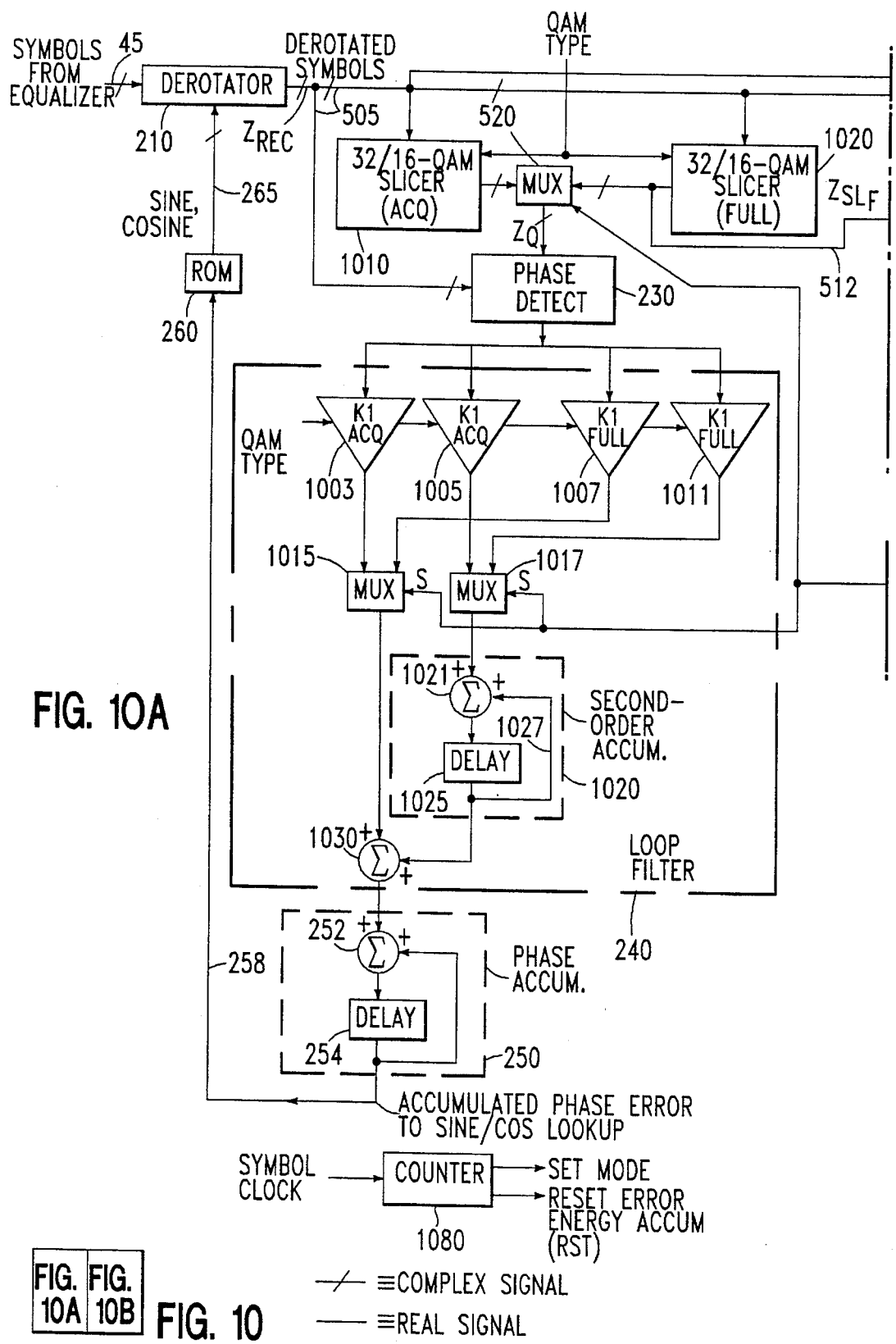

16- OR 32-QAM ACQUISITION SLICER

16/32 - QAM ACQUISITION SLICER

CARRIER RECOVERY SYSTEM USING ACQUISITION AND TRACKING MODES AND AUTOMATIC CARRIER-TO-NOISE ESTIMATION

BACKGROUND OF THE INVENTION

1. Field of the Invention

The invention relates to a carrier recovery system for use in illustratively a passband QAM (quadrature amplitude modulation) demodulator and specifically such a system, including apparatus and accompanying methods, that employs separate acquisition and tracking modes and automatic carrier-to-noise estimation.

2. Description of the Prior Art

Quadrature amplitude modulation (QAM) is increasingly seeing use as an attractive vehicle to transmit digital data. In that regard, several proposals exist in the art to broadcast high definition television (HDTV) signals as compressed digitized data using QAM.

In essence, QAM relies on transmitting data as a sequence of two-dimensional complex symbols, i.e. with both in-phase and quadrature components. Each symbol, based upon the data it represents, takes on a specific pre-defined value. A set of all of the values available for transmission defines an alphabet which, when graphically plotted, typically on a two-dimensional basis, forms a constellation. The size and shape of the constellation depends upon the number of discrete values in the set and their spatial location in the constellation. The constellation frequently proposed for use in broadcasting HDTV data contains, e.g., 16, 32 or 64 values (states), hence so-called 16, 32 or 64 QAM, respectively.

To receive broadcast QAM data, a QAM receiver essentially samples and filters a received output of a communication channel, and applies resulting filtered samples to a decoder (e.g. a Viterbi decoder), which contains one or more slicers, to yield detected symbols. The data contained in these latter symbols, if it contains compressed video information, is then appropriately decompressed to yield original source video data. To specifically accomplish QAM reception, a QAM demodulator within the receiver performs the functions of timing recovery, equalization and carrier recovery. To the extent relevant here, timing recovery, which typically occurs at one, two and/or four times a rate at which symbols are received, defines precise instances in time at which a received data stream must be sampled in order to minimize inter-symbol interference and establish a timing baseline at which a decision is to be made for each received symbol. In essence, timing recovery relies on accurately recovering, at a proper frequency, a clock signal from a received modulated waveform. This clock signal is used, in turn, to convert a continuous-time received signal into a discrete-time sequence of symbols. Equalization is essentially a filtering function which, generally adaptive, removes channel-induced artifacts and reduces inter-symbol interference (interference caused by amplitude and phase dispersion of the transmitted symbols that results from passage through the channel) from the received symbols. Carrier recovery, typically performed on a decision-directed basis and in the usual absence of a pilot tone, creates a reference carrier against which in-phase and quadrature modulated components may be determined, e.g. both in terms of frequency and phase, such that the received demodulated symbols do not rotate. It is the carrier signal that is quadrature modulated by the symbols and then transmitted to the receiver. Carrier recovery must be able to properly function in the presence of varying frequency offsets, drift or jitter that often occurs between a QAM transmitter and the receiver. Through carrier recovery, a carrier frequency offset value is translated into a value, typically a direct current (DC) or digitized value, that is generally and respectively fed as a control input to a voltage or numerically controlled oscillator situated within a phase-locked loop. The output of this oscillator, being locked in frequency and phase to the reference carrier signal, is then applied as, e.g., a local oscillator in a tuner section of the receiver to extract, e.g., baseband quadrature modulated, information from the continuous-time received signal. Inasmuch as the present invention is directed to carrier recovery systems, the remainder of the discussion will be so limited.

In general, carrier recovery is performed directly after equalization. Simplistically and conventionally speaking, carrier recovery involves applying the received symbols as one input to a de-rotator, specifically a complex multiplier. Quadrature (sine/cosine) outputs of a numerically controlled oscillator (NCO) are applied to another input of the de-rotator. To assure that the quadrature outputs of the oscillator are locked to and accurately track the carrier., in terms of both frequency and phase, essentially regardless of jitter in the carrier or frequency and/or phase offsets in the carrier between the transmitter and receiver, this oscillator is situated within a digital phase-locked loop (DPLL). This loop contains a phase comparator which determines, on a decision-directed basis, the phase error of a received constellation by comparing the phase of the output of the de-rotator to assumed ideal symbol positions in the same constellation. This determination entails comparing the phase error between each de-rotated received symbol and a resulting sliced symbol therefor. The resulting phase error signal is applied through a loop filter and then supplied to the NCO, which itself comprises an integrator (phase accumulator) and a sine/cosine look-up table. The de-rotated symbols are provided, as the detected symbols, to an output of the demodulator for subsequent decoding and, where suitable, decompression.

Conventional carrier recovery systems, of the type described above, suffer various drawbacks which tend to limit their utility, particularly, though not exclusively, when used in demodulating HDTV data.

First, these systems rely on determining the phase error by comparing the full constellation of the received symbols against their corresponding ideal values. Unfortunately, in practice, this approach often fails to achieve a lock or, should a lock occur, often leads to a false lock—the latter being a lock at certain erroneous phase shifts at which the resulting de-rotated constellation remains stable—in essence the de-rotated constellation remains tilted from its ideal orientation. These erroneous phase shifts are defined by the position of intermediate "zeroes" in the average phase error produced by the DPLL in this carrier recovery system. In such instances, each de-rotated received symbol typically falls within a corresponding decision region but for the wrong corresponding detected symbol. Consequently, the resulting detected symbols would simply be wrong and totally unusable. Nevertheless, since a resulting phase error, when averaged over many such received symbols, tends to remain close to zero, a conventional carrier recovery system will simply maintain the false lock.

Second, a certain number of symbols and hence time are both needed to acquire (or re-acquire) a phase lock. While ordinarily, for an HDTV transmission, the amount of symbols and attendant data loss is negligible, in certain instances the data loss can be quite objectionable to a viewer.

In particular, it is widely recognized in the art that, prior to the point at which the carrier recovery circuit is able to acquire a proper phase lock on the received symbols (particularly when accompanied by a phase error), this circuit will make wrong decisions and the received constellation will, in essence, continue to rotate. Eventually, the lock will be achieved and the received constellation will cease rotating though many symbols, e.g., tens of thousands (or more), may often need to occur in order to draw the circuit into lock. The number of erroneous decisions will decrease only after the lock occurs. Since the symbols used in achieving the lock are generally erroneous, the data content of all of these symbols is simply ignored. What this means is simply that the data, transmitted while a QAM receiver is attaining a carrier recovery phase lock, is simply lost to any downstream circuitry connected to the receiver. This, in turn, in the context of a received HDTV transmission, means that any accompanying broadcast visual and/or aural information or data occurring while a phase lock is being acquired, is not provided to the viewer.

At expected HDTV data rates of approximately 20–25 Mbits/second, a phase lock can often occur within a relatively short time, such as on the order of approximately a few milliseconds or so. Ordinarily, in reception areas that possess strong, stable received signals, the lock will generally persist for quite an extended period of time. Hence, the amount of data lost to a viewer while re-acquiring a phase lock as a function of the total amount of transmitted data will usually be quite small and thus generally imperceptible. However, in areas with varying and particularly poor signal strength, a phase lock may exist over only a relatively short interval thereby necessitating repeated re-acquisition of the lock. Consequently, the amount of data that is lost, as a percentage of the total transmitted data, could sharply increase. Hence, if the re-acquisition occurs sufficiently often, the relatively large amount of lost data can result in a highly objectionable image to a viewer.

Furthermore, larger constellations advantageously permit each symbol to contain a substantially increased data content, thereby, e.g., providing increasingly fine image resolution in a displayed HDTV image. Generally, an increased constellation, e.g. 32 or 64 state for HDTV, might be used in strong signal areas, with the constellation size being reduced by an HDTV broadcaster to 16 or 32 state, respectively, wherever interference is likely (such as, e.g., from a conventional "NTSC" television signal appearing on the same channel and transmitted from a neighboring geographic area). However, increasingly large constellations provide a correspondingly decreased slicing decision region around each symbol. This, in turn, aggravates the effect of the phase errors associated with each symbol. Consequently, an increased number of symbols (and hence time and delay) is required to achieve the phase lock. Therefore, where a larger constellation is used, a correspondingly increased amount of data must be expended and lost to the viewer each time a carrier recovery phase lock must be re-acquired. Should the received signal deteriorate, such as in the presence of noise or interference, repeated re-acquisition of the phase lock particularly for a large constellation, can erode image quality more rapidly than if a small constellation were to be broadcast.

Given these deficiencies, the art teaches that for a carrier recovery circuit to rapidly and accurately achieve a phase lock, particularly in hose instances where the lock could not be acquired by slicing using a full constellation, reduced constellation (RC) slicing should be used instead. In this regard, see N. K. Jablon, "Joint Blind Equalization, Carrier Recovery, and Timing Recovery for High-Order QAM Signal Constellations", *IEEE Transactions on Signal Processing*, Vol. 40, No. 6, June 1992, pages 1383–1397; and N. K. Jablon, "Joint Blind Equalization, Carrier Recovery, and Timing Recovery for 64-QAM and 128-QAM Signal Constellations", *Record of IEEE International Conference on Communications* (*Boston, Mass.*), Jun. 11–14, 1989, pages 1043–1049 (both of which are collectively hereinafter referred to as the "Jablon" publications). As described in the Jablon publications, for 16- and 64-QAM, a phase lock is first acquired through a phase comparison whenever just a pre-defined one of four corner symbols in the constellation, rather than all the symbols in the constellation, is detected. This particular corner symbol is detected by comparing the squared magnitude of all the received symbols against a pre-defined threshold. If the squared magnitude of a received symbol equals or exceeds the threshold, then the phase comparison occurs between this symbol and its ideal value. Otherwise, if the received symbol is less than the threshold, the output of the phase comparator is set to zero. However, the loop filter is updated normally every symbol period in order to permit the DPLL to track any frequency offset. Jablon postulates that since all the constellation symbols are equally affected by additive noise and adaptation noise, all the corner symbols in the constellation, which all have a longest radii and thus a largest signal to additive-plus-adaptive noise ratio of all the symbols, provide the most reliable information regarding the current orientation of the constellation. Throughout an interval defined by the occurrence of a finite number of symbols (a finite time interval) and during which reduced constellation slicing is used, the constellation will presumably become aligned and a phase lock achieved, i.e. acquired. Once this lock occurs, the carrier is then tracked, on a decision-directed basis, using full, rather than reduced, constellation comparisons.

While the incorporation of reduced constellation slicing proposed by the Jablon publications into a conventional decision-directed carrier recovery system, such as that described above, appears to achieve a phase lock in more instances than use of full slicing alone and is thus quite robust, I have discerned that the resulting system possesses various drawbacks which adversely limit its performance particularly with HDTV signal demodulation.

First, conventional decision-directed carrier recovery systems fail to account for variations in carrier-to-noise (CNR) ratio. I have found that these variations—which can occur often, if sufficiently large, can cause a false lock to occur. Specifically, if an (RC) acquisition/(full slicing) tracking strategy were simply incorporated into such a system as, e.g., taught by Jablon, then, a sufficiently large CNR variation would likely cause the system to erroneously remain in a (full slicing) tracking mode when the system should however switch back to an (RC) acquisition mode of operation, thereby causing a false lock to occur. This, in turn, would cause erroneous symbol detection. Second, the RC approach performs phase comparisons on a fixed number of symbols regardless of whether a phase lock is achieved or not during the corresponding time period. I have found that, in certain instances this time period may be excessive, i.e. a phase lock could be achieved in a shorter period of time, while insufficient in others, i.e. a phase lock could not be attained in the time allotted but could be achieved during a longer period.

Thus, a need exists in the art for a carrier recovery system, including apparatus and accompanying methods for use therein, which, when used in a QAM demodulator, advantageously and substantially eliminates false locks and also achieves a phase lock in far more instances than occur in the art. Furthermore, this carrier recovery system should acquire a phase lock over fewer symbols and hence faster than has occurred through conventional carrier recovery systems. In addition, this system should also provide an accurate phase lock over a wide range of CNRs. Advantageously, such a carrier recovery system should find wide use in a HDTV demodulator and, in those instances where repeated re-acquisition of the carrier phase lock is likely to occur, will result in less lost data and hence, e.g., a more pleasing image than that which would otherwise result from using such a conventional carrier recovery system.

SUMMARY OF THE INVENTION

My invention advantageously and substantially eliminates the deficiencies associated with conventional carrier recovery systems and particularly those destined for use in a QAM demodulator.

To achieve these advantageous results, a carrier recovery circuit is first operated in two modes: an acquisition mode to first attain an initial carrier lock, during which reduced constellation slicing is used; and a tracking (or lock) mode, during which full slicing is used, to accurately track variations in frequency and phase that may occur to the carrier while the circuit remains locked.

In accordance with my inventive teachings, rather than simply allocating a fixed period for RC slicing as is taught in the art, the mode of the circuit changes based upon whether an average error energy associated with fully sliced symbols is greater than or less than a pre-defined mode switching threshold (hereinafter referred to as simply a "switching" threshold) value. In that regard, if a carrier lock has not yet been acquired or is being re-acquired after having been lost, then as long as the average error signal remains greater than the switching threshold, the carrier recovery circuit remains in the acquisition mode with decision-directed operation occurring based on a simplified variant (as described below) of RC slicing. By using such RC slicing as long as needed to achieve a lock, this lock is reliably achieved far more often and generally faster than with carrier recovery circuits known in the art and engenders a data loss only for as long as is needed to achieve this lock. Once the lock is achieved and the average error energy decreases below the switching threshold, the mode of my inventive carrier recovery circuit changes to the tracking (or lock) mode wherein decision-directed operation relies on full rather than the simplified variant of RC slicing. In the event the lock is then lost and average error energy once again exceeds the switching threshold, the circuit once again returns to the acquisition mode to re-acquire the lock, and so on.

Furthermore, through my inventive teachings, I have found that, during the acquisition mode, the actual corner points of the symbols being received for RC slicing, as is taught in the art, do not need to be determined. Instead, as a variant thereof, only the quadrant of the outermost received symbols (which I refer to as "simplified" RC slicing) needs to be detected, thereby simplifying the circuitry of the acquisition slicer and its operation, and decreasing the time needed to achieve an initial carrier lock. Hence, through my invention, during the acquisition mode, symbols having magnitudes which lie within, e.g., a circular area peripherally defined by the magnitude of the corner symbols in the constellation are essentially ignored. Symbols with increased magnitudes are arbitrated, simply by viewing the sign bits of their in-phase and quadrature components, into one point (which point may not be part of the transmitted constellation) within each quadrant. None of these arbitrated points needs to represent an actual symbol. Based upon a decision flowing from this arbitration and the magnitude of the actual corresponding symbol, an accompanying phase error is determined therefor for use in attaining an initial carrier lock.

In addition, to ensure accurate operation over a wide range of noise conditions, the switching threshold changes in a pre-determined manner with changes in the noise content, particularly the carrier-to-noise ratio, of the received symbols.

As a feature of my invention, to impart added stability to the operation of the circuit by reducing its sensitivity to noise, multiple appropriately spaced apart switching threshold values, for the average error energy, instead of a single switching threshold value, can be used to change the mode of the circuit. Specifically, whenever the circuit is operating in one mode, e.g. the tracking mode, a different pre-defined, e.g. decreased, switching threshold value could be associated with moving back to the acquisition mode, and vice versa. As a result, the switching thresholds will differ depending upon the mode in which the circuit is currently operating.

Another feature of my invention lies in the ability of my inventive carrier recovery circuit to selectively operate on any one of a number of different QAM type signals, e.g. 16 or 32 QAM. Specifically, a QAM type detector is used to detect the particular type of QAM signal then being received, i.e. the size of the constellation, and generate a signal representative thereof. In response to this signal, my inventive circuit selects various pre-defined internal parameters, e.g. slicing and switching thresholds and gain values, that are appropriate to the specific constellation then being received and utilizes these parameters in, e.g., various slicing, filtering, comparison and table look-up operations.

BRIEF DESCRIPTION OF THE DRAWINGS

The teachings of the present invention can be readily understood by considering the following detailed description in conjunction with the accompanying drawings, in which:

FIG. 1 depicts the correct alignment of the drawing sheets for FIGS. 1A and 1B;

FIGS. 1A and 1B collectively depict a simplified very high level block diagram of receiver 5 that utilizes a passband QAM demodulator;

FIG. 5 depicts a block diagram of my inventive carrier recovery circuit 200;

FIG. 9C depicts the output of CNR detector 820 as a function of CNR for 16-QAM;

FIG. 9D depicts the output of CNR detector 820 as a function of CNR for 32-QAM;

FIG. 10 depicts the proper alignment for the drawing sheets for FIGS. 10A and 10B

FIGS. 10A and 10B collectively depict a detailed block diagram of embodiment 1000 of my inventive carrier recovery circuit 200, the latter being shown in FIG. 5, but for use with multiple different QAM constellations;

To facilitate understanding, identical reference numerals have been used, where possible and not stated to the contrary, to designate identical elements that are common to the figures.

DETAILED DESCRIPTION

After considering the following description, those skilled in the art will clearly realize that the teachings of my inventive carrier recovery system can be readily utilized in nearly any receiver that is designed to receive quadrature amplitude modulated (QAM) symbols, and regardless of the size of a particular QAM constellation, such as, e.g., 16, 32 or 64, in use. Use of my invention will advantageously permit that receiver to successfully lock onto transmitted data symbols in a faster, more reliable and more accurate manner than has heretofore been possible with QAM carrier recovery circuits known in the art. Furthermore, my invention can be used at passband or baseband. Nevertheless, to simplify the following discussion, I will discuss my invention in the context of use in a 16/32 passband QAM demodulator and, specifically, one intended for use in demodulating a high definition television (HDTV) QAM signal.

A. Overview of a QAM Receiver

Figure 1B:
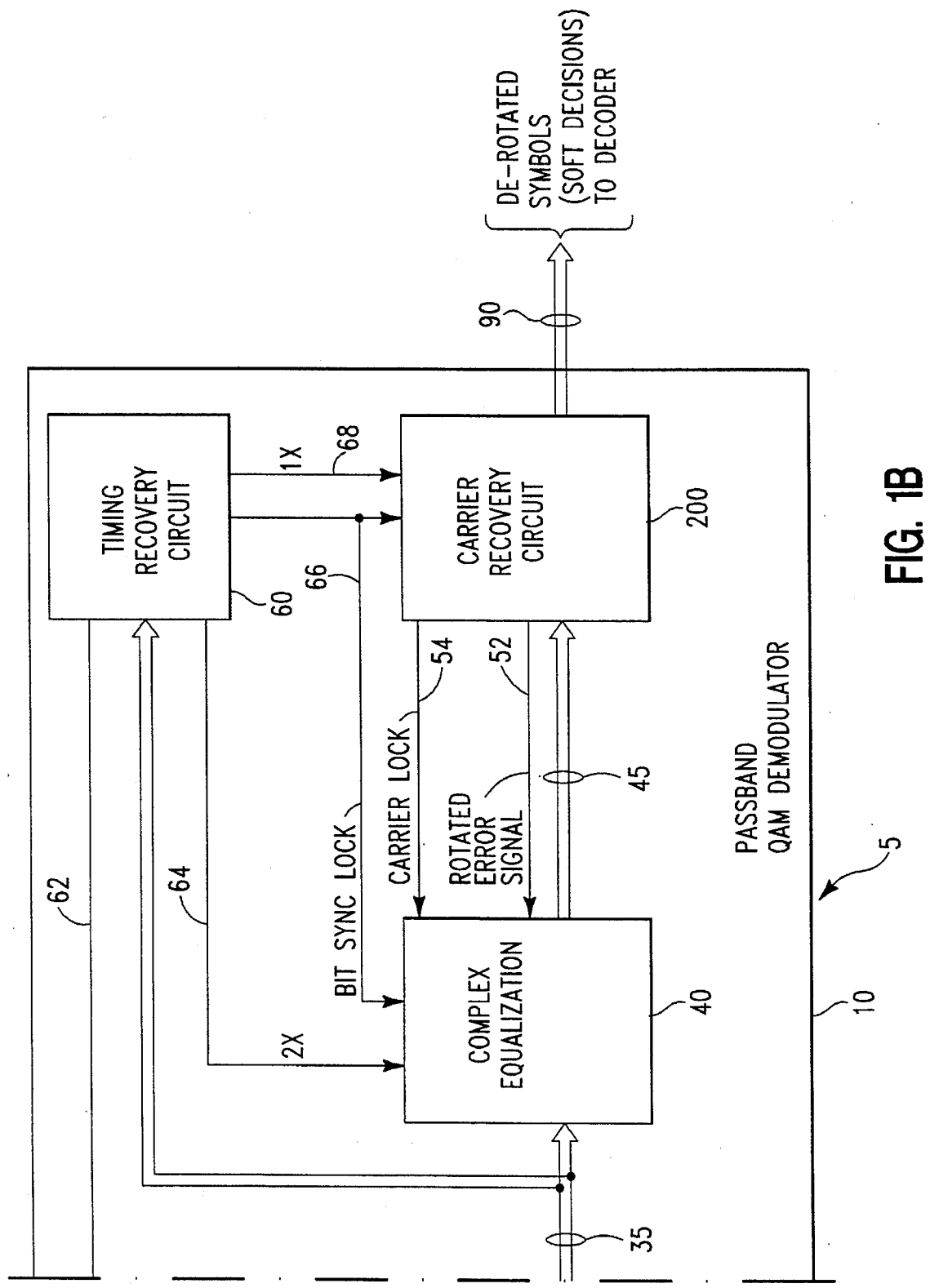

A simplified very high level block diagram of receiver 5, that utilizes a passband QAM demodulator, is collectively depicted in FIGS. 1A and 1B, for which the correct alignment of the drawing sheets for these figures is shown in FIG. 1.

In essence, QAM relies on transmitting data as a sequence of two-dimensional complex symbols, i.e. with both in-phase and quadrature components. Each symbol, based upon the data it represents, takes on a specific pre-defined value. A set of all of the values available for transmission defines an alphabet which, when graphically plotted, typically on a two-dimensional basis, forms a constellation (with an "x" mark for each symbol as shown in FIGS. 4A and 4B for 16- and 32-QAM, respectively). The size and shape of the constellation depends upon the number of discrete values in the set and their spatial location in the constellation.

As depicted in FIGS. 1A and 1B, receiver 5 is formed of tuner 7 and passband QAM demodulator 10. In operation, tuner 7, which is an analog circuit, extracts a desired analog passband signal, typically a particular desired broadcast signal, from all the broadcast signals appearing on input lead 3. This lead may connect to an antenna and/or a cable connection, both of which are conventional and not shown. The resulting analog passband signal produced by the tuner is routed, via lead 9, to the passband QAM demodulator which, through various digital operations described below, extracts modulated QAM symbols situated within the passband signal. Resulting de-rotated QAM symbols, i e so-called "soft decisions", are then applied, via output leads 90, to an appropriate and conventional decoder (not specifically shown), such as a Viterbi decoder. The decoder appropriately slices these decisions into detected symbols for subsequent processing and mirrors the encoding process used at a far-end transmitter (also not shown).

Demodulator 10 contains analog-to-digital (A/D) converter 20, complex Nyquist filters 30, complex equalizer 40, carrier recovery circuit 200, timing recovery circuit 60, filter 70 and voltage controlled oscillator (VCO) 80. The present invention resides within the carrier recovery circuit itself. As such, the other components situated within the demodulator will only be discussed in the detail needed to convey an overall understanding of the operation of the demodulator and the purpose which the carrier recovery circuit serves therein.

Specifically within demodulator 10, the input analog passband signal, provided by the tuner and appearing on lead 9, is routed to analog-to-digital converter (A/D) 20 which converts the analog passband signal to a synchronous stream of digitized samples. These samples are each typically 6 to 8 bits and occur at the symbol rate, which, for HDTV data, is typically on the order of 5 Msymbols/second which, in turn, yields a data rate of approximately 25 Mbits/second. To properly detect QAM data, these samples are then applied, via lead 25, to complex Nyquist filters 30. These filters produce an output signal having a desired Nyquist spectral shape and typically a maximal signal-to-noise ratio. These filters are conventional and contain two separate transverse multi-tap, e.g. 64 tap, finite input response (FIR) filters (not specifically shown) designed to operate at passband frequencies. One of the multi-tap filters extracts the in-phase component in the modulated data; the other extracts the quadrature component in this data. The weights in the two filters, which are identical at baseband, differ at passband by a phase rotation of 90 degrees. Collectively, these filters produce a one-sided analytic signal. Resulting in-phase and quadrature signals are applied, via leads 35, at four times the symbol rate, to timing recovery circuit 60 and, at twice the symbol rate, to complex equalizer 40.

In particular, timing recovery circuit 60 digitally generates clock pulses, typically at one, two and four times the symbol rate, to ensure that analog sampling by A/D converter 20 synchronously occurs at the symbol rate, thereby minimizing inter-symbol interference. These pulses define a timing baseline for use throughout demodulator 20 to ensure that each symbol decision is made at the correct time. To provide these clock pulses, timing recovery circuit 60 internally generates (though not specifically shown) an absolute value of the in-phase and quadrature components that appear on leads 35 and are generated by filters 30. As a result of this operation, a signal is produced within circuit 60 that has a bit tone at the symbol rate. This bit tone is then filtered and thereafter applied as an input to a second-order phase-locked loop circuit (also not shown) which itself is phase-locked, by changing a sampling rate, to a free-running waveform of 1, 0, −1, 0, . . . When the sampling rate of this free-running waveform is exactly four times the symbol rate, a quadrature output of the filter will produce a 90-degree phase shifted version of the free-running waveform, hence resulting in a zero mean error signal to this phase-locked loop circuit. A resulting one-bit phase-locked signal produced by this loop circuit is applied, via output lead 62, to analog filter 70. The output of this filter, appearing on lead 75, is applied as an analog control signal to VCO 80 to generate a properly timed clock signal on lead 85 that sets the sampling provided by A/D converter 20 to occur synchronously at four times the symbol rate. Symbol decision timing that occurs throughout the remainder of demodulator 10 occurs at a given point of the phase-locked locally occurring 1, 0, −1, 0, . . . waveform.

In addition to providing a sampling clock signal on lead 64, at twice the symbol rate for use by equalizer 40, and at the symbol rate on lead 68 for use by carrier recovery circuit 200, timing recovery circuit 60 also produces a BIT SYNC LOCK control signal on lead 66. This control signal, when asserted high, signifies that the timing recovery circuit has established correct bit synchronization. Carrier recovery and equalization will only occur as long as this signal remains asserted high. If this signal is de-asserted, then bit synchronization has not occurred or has been lost. In these latter instances, sampling timing would be incorrect. Since incorrect samples would only corrupt proper operation of qualizer 40 and carrier recovery circuit 200, these components effectively halt adaptation and temporarily freeze their tap weights, whenever timing recovery circuit 60 de-asserts the BIT SYNC LOCK control signal. Alternatively, such adaptation could be halted by an appropriate control signal other than the BIT SYNC LOCK signal.

The complex symbols produced by filters 30 are clocked into complex equalizer 40 at twice the symbol rate. The equalizer removes channel-induced artifacts and reduces inter-symbol interference (interference caused by amplitude and phase dispersion of the transmitted symbols that results from passage through the channel) from the received symbols. Equalizer 40 is a complex adaptive linear passband FIR filter whose tap weights are adaptively controlled, and specifically are temporally adjusted through a suitable adaptation algorithm. If carrier recovery circuit 200 loses carrier lock as indicated by a de-assertion of a CARRIER LOCK control signal appearing on lead 54 from carrier recovery circuit 200, then equalizer 40 utilizes a blind (constant modulus) adaptation algorithm;otherwise if a carrier lock is attained (signified by the CARRIER LOCK signal being asserted high by circuit 200) and the complex signal applied to the equalizer has a sufficiently high signal-to-noise ratio, a decision-directed adaptation algorithm is used instead. To provide proper decision-directed equalization, equalizer 40 utilizes an error signal, indicative of any error between each received (de-rotated) and corresponding sliced symbol, on lead 52 and provided by carrier recovery circuit 200. This error may be in any direction and occur even with no phase rotation but with wrong equalizer tap weights—which is why this error can be used to properly adjust these weights.

Carrier recovery, typically performed on a decision-directed basis and in the usual absence of a pilot tone, creates a reference carrier against which in-phase and quadrature modulated components may be determined, e.g. both in terms of frequency and phase, such that the received demodulated symbols do not rotate. It is the carrier signal that is quadrature modulated by the symbols and then transmitted to the receiver. Carrier recovery must be able to properly function in the presence of varying frequency offsets, drift or jitter that often occurs between a QAM transmitter and the receiver. One output of the carrier recovery circuit is de-rotated complex symbols ("soft decisions") that appear on leads 90. Inasmuch as the BIT SYNC LOCK control signal or the manner through which it is generated does not form part of the present invention, then, to simplify the following discussion, this signal will be ignored from here on.

B. Conventional vis-a-vis Inventive Passband QAM Carrier Recovery Circuit

To facilitate reader understanding, the description will proceed as follows: I will first describe a conventional implementation of carrier recovery circuit 200 and its accompanying performance deficiencies, followed by describing, in detail, my inventive implementation of circuit 200 along with its improved characteristics and then address, in detail, various component blocks of my inventive implementation and simulated performance results.

1. Conventional Passband QAM Carrier Recovery Circuit

Figure 2:
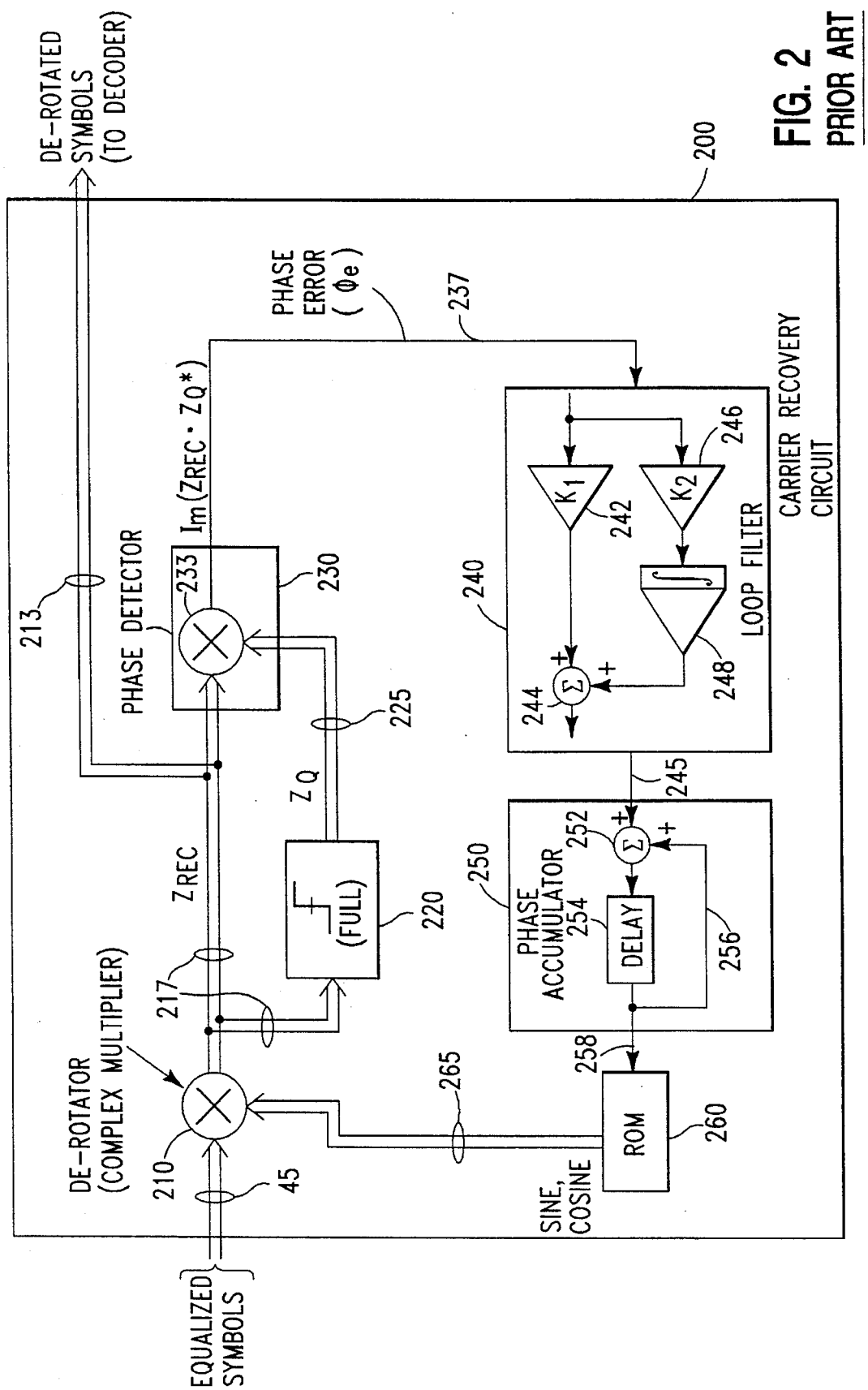
FIG. 2 depicts a block diagram of conventional carrier recovery circuit 200 that may be utilized within receiver 5 shown in FIGS. 1A and 1B.

FIG. 2 depicts a block diagram of conventional carrier recovery circuit 200 that may be utilized within receiver 5 shown in FIGS. 1A and 1B.

As depicted in FIG. 2, carrier recovery is performed through a digital phase-locked loop (DPLL) in which a reference carrier, on leads 265, is fabricated for use in de-rotating incoming equalized symbols. To assure that the reference carrier is accurate, i.e. this carrier properly responds in the presence of jitter in the received signal or frequency and/or phase shifts between the transmitter and receiver, and thus can be used to properly de-rotate the equalized symbols, this carrier is adjusted, in terms of both frequency and phase, within the DPLL based on a phase error ($\phi_e$) that occurs between each de-rotated symbol and its corresponding ideal sliced value.

Specifically, incoming equalized symbols are applied, via leads 45, as one input to de-rotator 210, which itself is a complex multiplier. Quadrature outputs of a sine generator, specifically read only memory (ROM) 260 which contains stored tables of sine and cosine values, are applied to another input of the de-rotator. For any input to the table, the corresponding sine output produces the in-phase component of the reference carrier; the corresponding cosine output produces the quadrature component of this carrier. To simplify implementation, separate sine and cosine tables can be used. Alternatively, to reduce the size of the table, a single table of, e.g. sine values can be used with the input to this table being appropriately incremented by one-quarter of the full address space of the table in order to yield the corresponding cosine value therefor. In any event, the input address to ROM 260 is an integrated phase error appearing on lead 258.

The phase error signal is first synthesized by determining a phase error between each incoming equalized de-rotated symbol ($Z_{REC}$) and its corresponding ideal sliced value therefor ($Z_Q$). In particular, each de-rotated symbol produced by de-rotator (complex multiplier) 210 is applied, via leads 217, as one input to phase detector 230 and to full slicer 220. Slicer 220 is a conventional two-dimensional quantizer that maps each input symbol in the constellation in use into a corresponding output symbol. To do so, a predefined typically square decision region is associated with each different output symbol. If 16-QAM is used, then slicer 220 has 16 separate decision regions that spatially fill the constellation with each region being centered around a different symbol in the 16-QAM alphabet. Similarly, if 32-QAM is used, then this slicer utilizes 32 different decision regions that fill the constellation, one for each of the 32 different symbols in the corresponding 32-QAM alphabet. In any event, for any input symbol, the output symbol produced therefor is simply given by the decision region on or within which the input symbol falls. The resulting sliced symbols produced by slicer 220 are applied, through leads 225, as sliced symbols $Z_Q$ to another input of phase detector 230. The phase detector determines the phase error ($\phi_e$) between each de-rotated symbol and its corresponding sliced value as being an imaginary part of the complex product of the equalized symbol and the conjugate of the sliced value. A resulting scalar phase error is applied, via lead 237, to an input of second-order loop filter 240 and, from there, to phase integrator (accumulator) 250. A resulting integrated (accumulated) phase error appearing on lead 258 is applied as input to ROM 260.

Second-order loop filter 240, here shown for ready understanding as its analog circuit equivalent, is formed of one leg containing first-order gain element 242 (with variable gain $K_1$) situated in parallel with another leg having series-connected integrator 248 and gain element 246 (with variable gain $K_2$). The output of both legs is summed through summer 244 to yield a filtered phase error signal appearing on lead 245. The output of loop filter 240 is routed to phase accumulator 250 which merely integrates the filtered phase error produced by the loop filter. Accumulator 250 is formed of summer 252, delay element 254 and feedback path 256. Through summer 252 and feedback path 256, an incoming value is simply added to the present output produced by this circuit with the resultant value being delayed, through delay element 254, one symbol time, to produce the next successive output value, and so on. By virtue of using second-order filtering inherent in loop filter 240, the DPLL implemented in circuit 200 can attain a phase lock on a constellation formed of equalized symbols without a steady-state phase offset as a function of input frequency offset, as would otherwise occur in the case of a first-order loop filter. Circuit 200, utilizing decision-directed feedback, is frequently referred to in the art as a "Costas loop".

2. Deficiencies with the Conventional Passband Carrier Recovery Circuit

A conventional carrier recovery circuit shown in FIG. 2, suffers various drawbacks which tend to limit its utility, particularly when used with demodulating HDTV data.

First, this circuit, through full slicer 220, relies on determining the phase error by comparing the full constellation of the received symbols against their corresponding ideal values. For 16-QAM, 16 different symbols are compared; for 32-QAM, 32 different symbols are compared; and so on for other sized constellations. In practice, this approach often fails to achieve a lock or, should a lock occur, often leads to a false lock—the latter being a lock at certain erroneous phase shifts at which the resulting de-rotated constellation remains stable—in essence the de-rotated constellation remains tilted from its ideal orientation. These erroneous phase shifts are defined by the position of intermediate "zeroes" in the average phase error produced by the DPLL in carrier recovery circuit 200. In such instances, each de-rotated received symbol typically falls within a corresponding decision region but for the wrong corresponding output symbol. Consequently, the resulting output (detected) symbols are all erroneous and totally unusable. Nevertheless, since the accumulated phase error, when averaged over many such detected symbols, tends to remain close to zero, carrier recovery circuit 200 will simply maintain the false lock.

Figure 3:
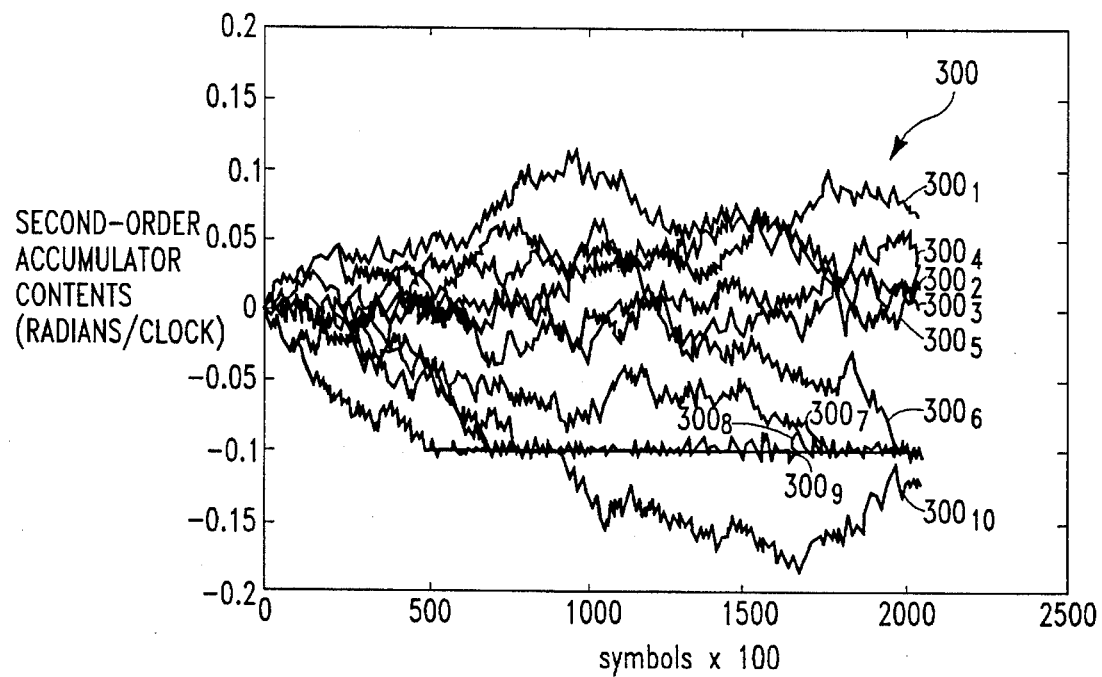
FIG. 3 graphically depicts traces 300 for ten separate simulated attempts at achieving a lock using conventional carrier recovery circuit 200 shown in FIG. 2 for 200K received 32-QAM symbols.

FIG. 3 illustrates the difficulty experienced by conventional carrier recovery circuit 200 in attaining a phase lock. In particular, this figure graphically depicts traces 300 (specifically traces $300_1$, $300_2$, ..., $300_{10}$) for ten separate corresponding simulated attempts at achieving such a lock during an interval defined by 200K received QAM symbols. I have generated these traces through computer simulations of the performance of conventional carrier recovery circuit 200. (FIGS. 4C, 6B, 15 and 16A–16F show traces, for simulated operating conditions set forth below, which were generated through the same type of simulations). In particular, for the traces shown in FIG. 3, the input passband signal was set to have a carrier-to-noise ratio of 15 dB, gains $K_1$ and $K_2$ were respectively set to 0.2 and 0.002, and a frequency offset was set to 0.1 radians/clock cycle. I used ten separate and successive streams of QAM values from a common HDTV signal source with the resulting second-order accumulated phase error (e.g. the output of integrator 248 shown in FIG. 2) being plotted as a function of the received symbols. No scaling was employed in the second order accumulator, i.e. the contents of this accumulator were not scaled by $1/|Z_Q|^2$. As such, the contents of this accumulator were not strictly proportional to the phase error. As can be readily seen, a lock at the offset frequency was achieved within 200K symbols in only three of the ten attempts with all the others failing to achieve a lock within this interval.

Second, a certain number of symbols and hence time are both needed to acquire (or re-acquire) a phase lock. While ordinarily, for an HDTV transmission, the amount of symbols and attendant data loss is negligible, in certain instances a relatively large number of symbols and hence time is needed to attain a lock. The ensuing data loss that would occur during this time can be quite objectionable to a viewer. In that regard, the attempts shown by traces $300_1$ through $300_5$ may require considerably more symbols than 200K symbols to achieve a lock, assuming the lock would be achieved at all.

The art teaches that these deficiencies may be ameliorated through reduced rather than full constellation slicing. However, I have found that conventional decision-directed carrier recovery circuits, including those that utilize reduced constellation (RC) slicing, fail to account for variations in the carrier-to-noise ratio and thus are quite susceptible to false locks and erroneous symbol detection. In addition, RC slicing, as taught in the art, relies on a reduced slicing interval determined by a fixed number of symbols, regardless of whether a lock is achieved there during or not. Thus, in some instances, the RC approach expends excessive time in achieving a lock; while in other instances, may not permit sufficient time to occur in order to achieve the lock.

3. Inventive Passband Carrier Recovery Circuit

I have determined that these deficiencies in the art, both in conventional and RC slicing, can be substantially eliminated by first operating the carrier recovery circuit in two modes: an acquisition mode to first attain a carrier lock, during which reduced constellation (RC) slicing is used; and a tracking (or lock) mode, during which full slicing is used, to accurately track variations in frequency and phase that may occur to the carrier while the circuit remains locked.

However, in accordance with my inventive teachings, rather than simply allocating a fixed period for RC slicing as is taught in the art, the mode of my inventive circuit changes based upon whether the average error energy associated with fully sliced symbols is greater than or less than a pre-defined mode switching threshold (hereinafter simply referred to as "switching" threshold) value. In that regard, if a carrier lock has not yet been acquired or is being re-acquired after having been lost, then as long as the average error signal remains greater than the switching threshold, my inventive carrier recovery circuit remains in the acquisition mode with decision-directed operation occurring based on a variant of RC slicing. By using such RC slicing as long as needed to achieve a lock, my inventive circuit reliably achieves a lock far more often and generally faster than with carrier recovery circuits known in the art and engenders a data loss only for as long as is needed to achieve this lock. Once the lock is achieved and the average error energy decreases below the switching threshold, the mode of the circuit changes to the tracking (or lock) mode wherein decision-directed operation relies on full rather than the variant of RC slicing. In the event the lock is then lost and average error energy once again exceeds the switching threshold, the circuit once again returns to the acquisition mode to re-acquire the lock, and so on.

To impart added stability to the operation of the circuit by reducing its sensitivity to noise, appropriately spaced apart threshold values can be used instead of a single switching threshold value. Specifically, whenever my inventive carrier recovery circuit is operating in one mode, e.g. the tracking mode, a different pre-defined, e.g. decreased, switching threshold value could be associated with moving back to the acquisition mode. As a result, the switching thresholds will differ depending upon the mode in which the carrier recovery circuit is currently operating.

Furthermore, rather than determining the corner points for RC slicing as is taught in the art, I have found it quite sufficient, during the acquisition mode, to merely determine the quadrant of the outermost received symbols. Hence, during such RC slicing, as I use it (hereinafter referred to and defined as "simplified" RC slicing), symbols having magnitudes which lie within, e.g., a circular area in the constellation peripherally defined by the magnitude of the corner symbols are essentially ignored. However, symbols with increased magnitudes are arbitrated, simply by viewing the sign bits of their in-phase and quadrature components, into one point (which point may not be part of the transmitted constellation) within each quadrant. None of these arbitrated points needs to represent an actual symbol. Based upon a decision flowing from this arbitration and the magnitude of an actual corresponding symbol, the accompanying phase error is determined therefor for use in acquiring an initial carrier lock.

For example, FIGS. 4A and 4B respectively depict constellations 410 and 430 for 16- and 32-QAM. Each symbol in the constellation is denoted by an "x". For purposes of clarity, similar numeric symbol values are shown and utilized herein for both constellations. However, in practice, the values for each constellation would be set, typically through equalization and operation of an automatic gain control (AGC) circuit (not shown), to yield the same average signal power for each and every different constellation. With respect to 16-QAM depicted in FIG. 4A, the permissible nominal symbol values are for both x and y coordinates: ($\pm 1$, $\pm 3$) with the nominal squared magnitudes being approximately 2, 10 and 18. Constellation 410 ordinarily contains three rings corresponding to squared symbol magnitudes of 2, 10 and 18, of which here only two of these rings, i.e. rings 417 and 419, are specifically shown. For acquisition slicing, the symbols having a magnitude (R) equal to or less than that of corner symbols $419_1$, $419_2$, $419_3$ and $419_4$ (and certainly including those on or within ring 417) are ignored. During acquisition slicing, the quadrant of the received symbols is determined by merely sensing the sign of both the in-phase and quadrature components of any received symbols that have a magnitude in excess of R and thus lie outside of corner symbols $419_{1:4}$. Each of these received symbols is then arbitrated into one corresponding point/quadrant (not specifically shown in this figure), with slicing performed thereon and a phase error being determined therefor. The motivation for doing so is simply that, due to additive noise or the like, any received symbol that has a magnitude greater than that of symbols $419_{1:4}$ was probably transmitted as one of these four symbols.

For 32-QAM, as shown in FIG. 4B, permissible nominal symbol values, for the same average energy as the 16-QAM constellation and for both x and y coordinates, are: ($\pm 1$, $\pm 3$, $\pm 5$) with nominal squared magnitudes being approximately 2, 10, 18, 26 and 34. Received symbol magnitudes essentially fall on rings 431, 433, 434, 435 and 437. For acquisition slicing, the symbols that have a magnitude that equals or is less than that for outermost ring 437 are ignored. During acquisition slicing and as with 16-QAM discussed above, the quadrant of the received symbols is determined by merely sensing the sign of both the in-phase and quadrature components of any received symbols that have a magnitude in excess of that of ring 437. Each of these received symbols is then arbitrated into one corresponding point/quadrant, such as one of points $438_1$, $438_2$, $438_3$ and $438_4$ with slicing performed on this particular point and a phase error being determined therefor. The location of each of these arbitrated points is not critical but preferably lies along a line (e.g. line 460 in the upper right quadrant) extending from an origin of the constellation and extending outward approximately mid-way between nearby corner constellation points. None of these arbitrated points represents actual symbols within constellation 430. As will be discussed in detail below, the arbitrated points are appropriately scaled based on the particular constellation in use. As such, the location of illustrative point 438₂ can vary, based on its scaling, along line 460 and in the directions shown by arrow 457. The position of all the other arbitrated points exhibits an identical variation.

In addition, to properly operate, and achieve and maintain a true lock across a wide range of different carrier-to-noise ratios (CNRs), my inventive circuit also estimates a current CNR, based upon the received symbols, and selects a switching threshold value (one or two, if multiple threshold values are used) that is most appropriate to the current CNR. This noises is not limited to merely channel noise but, in fact, encompasses noise introduced from any source ahead of my inventive carrier recovery circuit. In that regard, all or a portion of this noise could be quantization noise (generated within A/D converter 20 shown in FIGS. 1A and 1B) or equalization noise (the latter produced by incomplete or improper equalization that may initially occur within equalizer 40). As such, by adaptively varying the switching threshold value(s) based on the current CNR, my inventive circuit properly operates under an assumed low CNR condition before equalizer 40 has converged (even if it operates in a so-called "blind" mode).

Specifically, CNR detection is accomplished through a histogrammed distribution of the magnitude of the de-rotated QAM symbols. In essence, the magnitude of these symbols is mapped into pre-defined numeric ranges (so-called "bins") associated with magnitude rings of the particular QAM constellation being received. The count in the "bins" defines the current CNR. A table look-up operation then occurs to specify the appropriate switching threshold value(s) or the current CNR. Noise, from any source situated ahead of my inventive circuit, merely spreads the rings out which, in turn, reduces the histogrammed distribution in these pre-defined ranges thereby changing the switching threshold value(s).

Figure 4C:
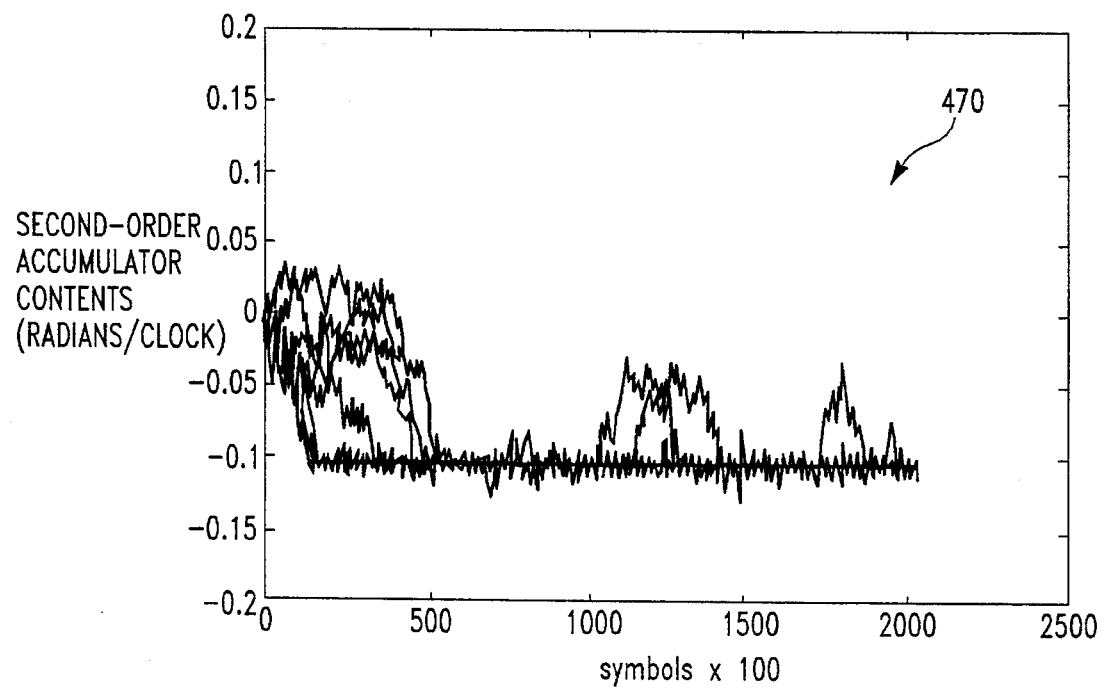
FIG. 4C graphically depicts traces 470 for ten separate simulated attempts at achieving a lock, during an acquisition mode, using simplified reduced constellation (RC) slicing in accordance with my inventive teachings for 200K received QAM symbols.
Figure 4A:
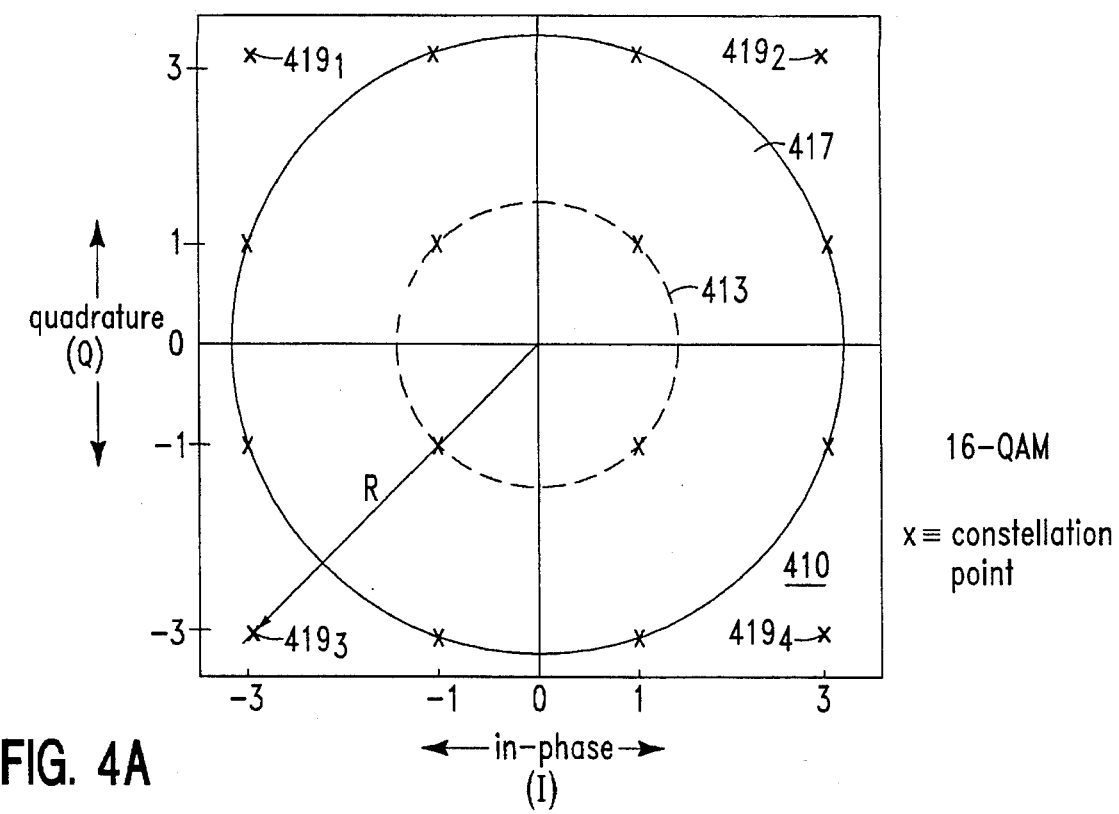
FIG. 4A depicts symbol constellation 410 for 16-QAM.
Figure 4B:
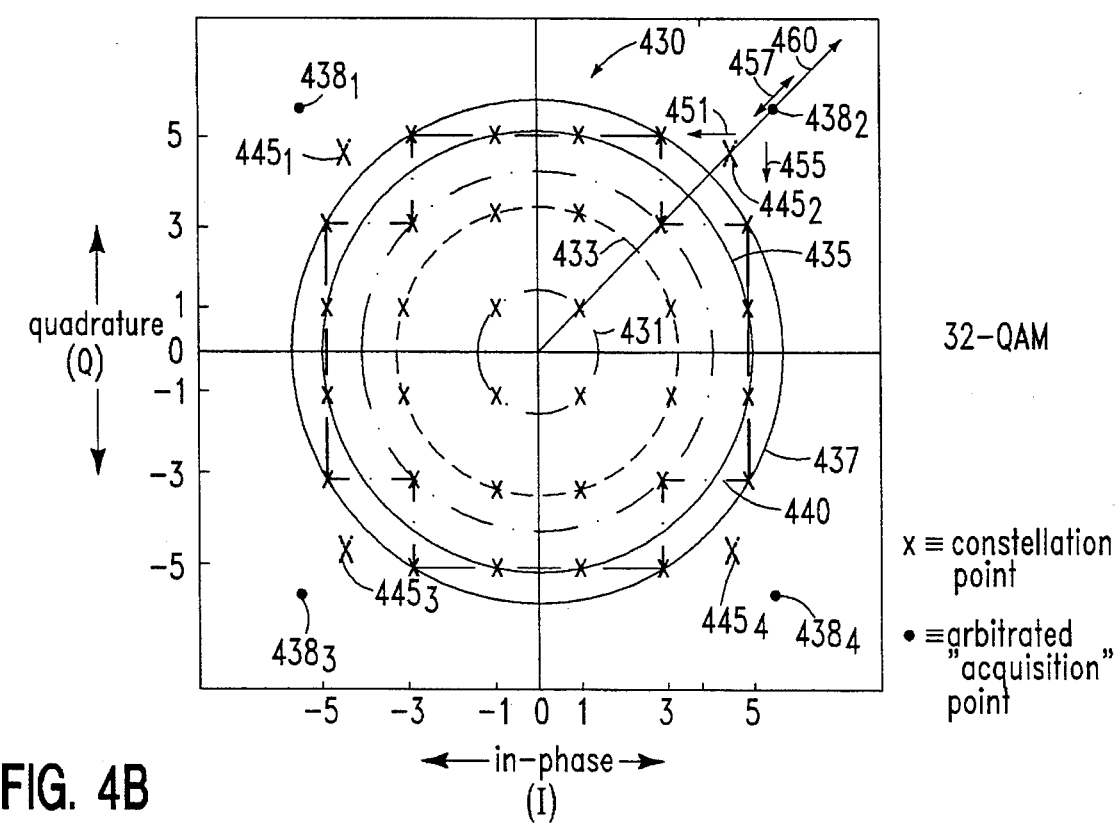
FIG. 4B depicts symbol constellation 430 for 32-QAM and four associated arbitrated points.

To illustrate the improved operation achievable through use of my inventive teachings, FIG. 4C graphically depicts traces 470 for ten separate simulated attempts at achieving a carrier lock using simplified RC slicing for 200K received QAM symbols. As can be seen, all ten attempts yielded a lock within 200K symbols. In certain attempts, as shown by peaks that developed in the second-order accumulated phase error after approximately 100K–125K symbols have occurred, the lock was lost, but was nevertheless quickly re-established thereafter.

I will now address, in detail, my inventive implementation of carrier recovery circuit 200. To simplify the discussion and enhance reader understanding, I will first describe inventive circuit 200, in conjunction with FIGS. 5–9, for use with a single fixed sized constellation, e.g. 32-QAM. Thereafter, through FIGS. 10–14, I will describe how this circuit can be easily modified to accommodate multiple different-sized constellations.

FIG. 5 depicts a block diagram of my inventive carrier recovery circuit 200. As depicted, inventive circuit 200 differs from conventional circuit 200 shown in FIG. 2 through the inclusion, within a carrier recovery DPLL, shown in FIG. 5, of acquisition slicer 510, multiplexer 520, mode selection comparator circuit 530, average error energy determining circuit 700, carrier-to-noise estimator 800 and read only memory (ROM) 540.

As depicted, incoming equalized symbols are applied, via leads 45, as one input to de-rotator (complex multiplier) 210. Resulting de-rotated symbols ($Z_{REC}$) are applied, through leads 505, as input to full (tracking) slicer 220, acquisition slicer 510, average error energy determining circuit 700 and carrier-to-noise estimator 800 and, through leads 505, as one input to phase detector 230. Each de-rotated symbol is simultaneously sliced, through full (tracking) slicer 220 into a full 32-QAM alphabet, $Z_{SL_F}$, and, through acquisition (simplified RC) slicer 510, into one of four arbitrated points $Z_{SL_a}$. The complex outputs of both of these slicers are routed, via leads 512 and 517, to corresponding inputs (A and B) of multiplexer 520. Based upon the mode in which circuit 200 is then operating, i.e. acquisition or tracking, and specifically a state of a MODESELECT (SEL) signal appearing on lead 535 and applied to a select (S) input to multiplexer 520, the multiplexer will route either the resulting fully sliced symbols or the simplified RC sliced symbols that appear on respective leads 512 or 517 onward, as sliced symbols $Z_Q$, to another input of phase detector 230. The phase detector, specifically one half of complex multiplier 233 therein, will determine a scalar phase error ($\phi_e$) between de-rotated symbols $Z_{REC}$ and sliced symbols $Z_Q$ in the same manner as set forth above. In particular, a full complex multiplier contains four real multipliers and two adders; in contrast, one half of a complex multiplier contains just two real multipliers and an adder. In any event, the resulting phase error is then applied, as described above, through second-order loop filter 240 and phase accumulator 250 to generate an second-order accumulated (integrate) phase error on lead 258 that is used to access ROM 260. This ROM, in turn, generates a reference carrier, through sine and cosine outputs, on leads 265. This carrier is, in turn, applied to another input to de-rotator 210.

Figure 7:
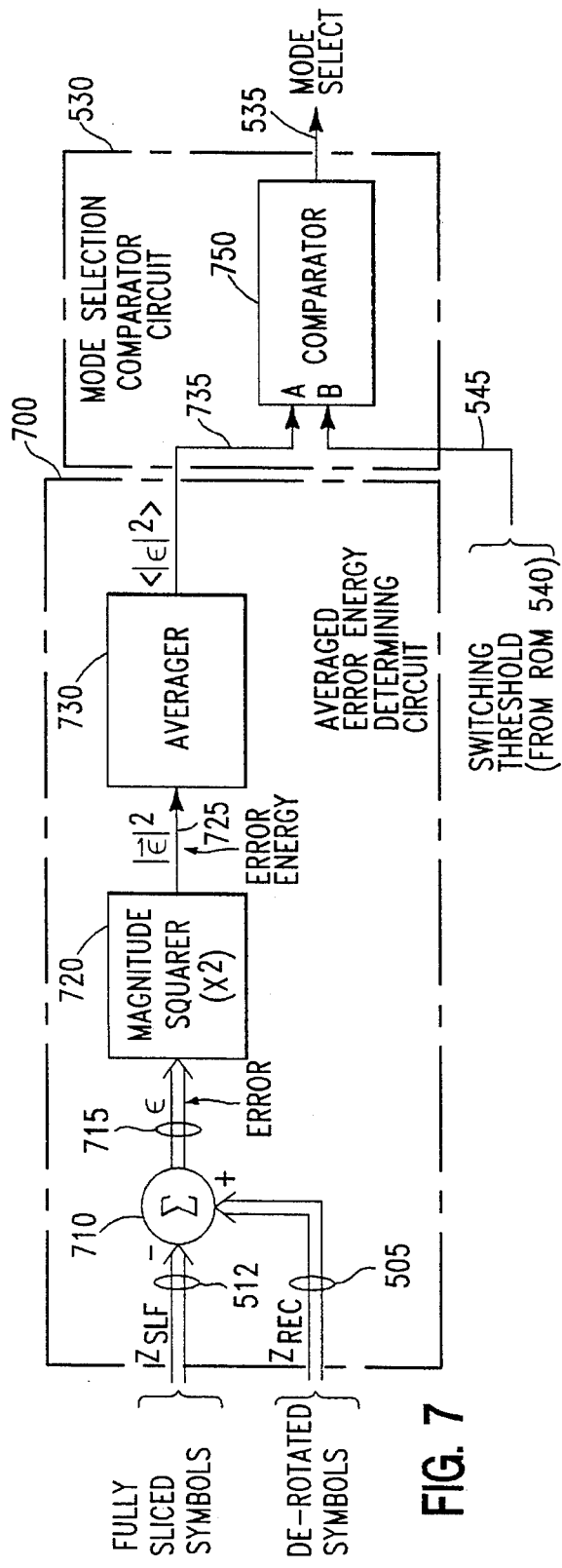
FIG. 7 depicts a block diagram of average error energy determining circuit 700 and mode selection comparator circuit 530, both of which are employed within inventive carrier recovery circuit 200 shown in FIG. 5.

The MODE SELECT signal appearing on lead 535 is generated through mode selection comparator circuit 530. This circuit, as described in detail below in conjunction with FIG. 7, is a comparator which compares the average error energy, between the fully sliced symbols and the de-rotated symbols, to a pre-determined threshold. Average error energy determining circuit 700, in a manner described in detail below also in conjunction with FIG. 7, calculates the average error energy between the de-rotated symbols ($Z_{REC}$) appearing on leads 505 and the fully sliced symbols ($Z_{SL_F}$) appearing on leads 512. The resulting average error energy value is applied over lead 735 to one input of circuit 530. In response to the de-rotated symbols appearing on leads 505, carrier-to-noise estimator 800, in a manner to be described in detail below in conjunction with FIG. 8, generates an estimate of the carrier-to-noise ratio (CNR) of the received symbols and applies this estimate to lead 830. This estimate is the same whether for either the rotating equalized symbols appearing on leads 45 or the de-rotated symbols appearing on leads 505. For illustrative purposes, in circuit 200 shown in FIG. 5 and circuit 1000 shown in FIG. 10, CNR estimator 800 utilizes de-rotated symbols as input, although the equalized rotating symbols could alternatively be used instead. In any event, as shown in FIG. 5, the CNR estimate, appearing on lead 830, is used to access ROM 540. This ROM stores a table of switching threshold values as a function of estimated CNR. Given the CNR estimate as an input address to the ROM, the switching threshold value then produced by ROM 540 is applied, via leads 545, to another input of comparator circuit 530. In the absence of using multiple switching thresholds as is the case in circuit 200 shown in FIG. 5, one switching threshold value (as implicitly shown) is provided by the ROM for each CNR estimate. If multiple threshold values are used, then ROM 540 (as will be discussed below in conjunction with FIG. 10) would produce two switching threshold values: one for use during the acquisition mode, another for use during the tracking mode.

Thus, as can be seen, once a switching threshold value has been provided, the mode in which circuit 200 operates is a function of the average error energy associated with the fully sliced symbols. Of course, this threshold value varies with changes in the CNR of the received symbols and hence so will the switching points at which the circuit changes modes.

In particular, if the CNR degrades (lessens), the value of the switching threshold will increase to ensure that, owing to a heightened noise content, accurate symbol detection, through full slicing, will still occur. Conversely, if the received signal strength then increases, i.e. the received symbol CNR increases, the value of the switching threshold then decreases. The particular values of the switching threshold are empirically determined as a function of the range of CNRs that occurs in practice.

Figure 6A:
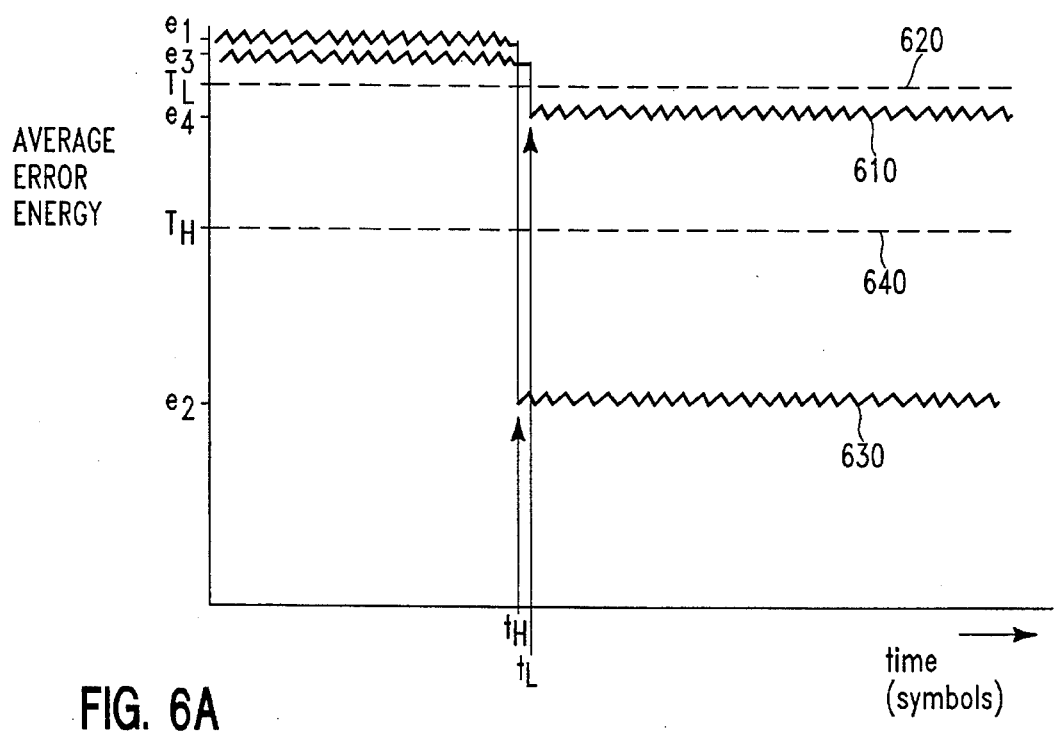
FIG. 6A graphically depicts an illustrative example of how, in accordance with my inventive teachings, a mode switching threshold varies with respect to a change in carrier-to-noise ratio (CNR) of received symbols.

Assume, for purposes of understanding and as illustratively shown in FIG. 6A, that, as represented by graph 630, the received symbols initially possess a relatively high CNR. A lock condition occurs at time $t_H$ at which point the detected average error energy decreases appreciably from, for example, values $e_1$ to $e_2$. At this level of CNR, a switching threshold would likely be set at approximately value $T_H$ to change the modes from acquisition to tracking and hence use full rather than simplified RC slicing. However, if the CNR were to lessen such as shown in graph 610, then, once a lock was obtained (at illustratively time $t_L$), the average error energy would rise from, e.g. $e_2$ to $e_4$. As can be seen, threshold $T_H$ would simply be too low and not be reached. Consequently, if the switching threshold value were not changed, the circuit would not switch from the acquisition to the tracking mode even after a lock was obtained, thereby engendering erroneous symbol detection. Rather than maintaining the switching threshold at a fixed value, such as value $T_H$, as taught in the art, the switching threshold used in my inventive circuit automatically increases from values $T_H$ to $T_L$ to establish a proper point at which inventive circuit 200 can switch modes from acquisition to tracking in view of a decreased CNR, thereby ensuring accurate symbol detection even in the presence of increased noise. Similar, but opposite, changes in the switching threshold values would occur as the CNR increased.

Figure 6B:
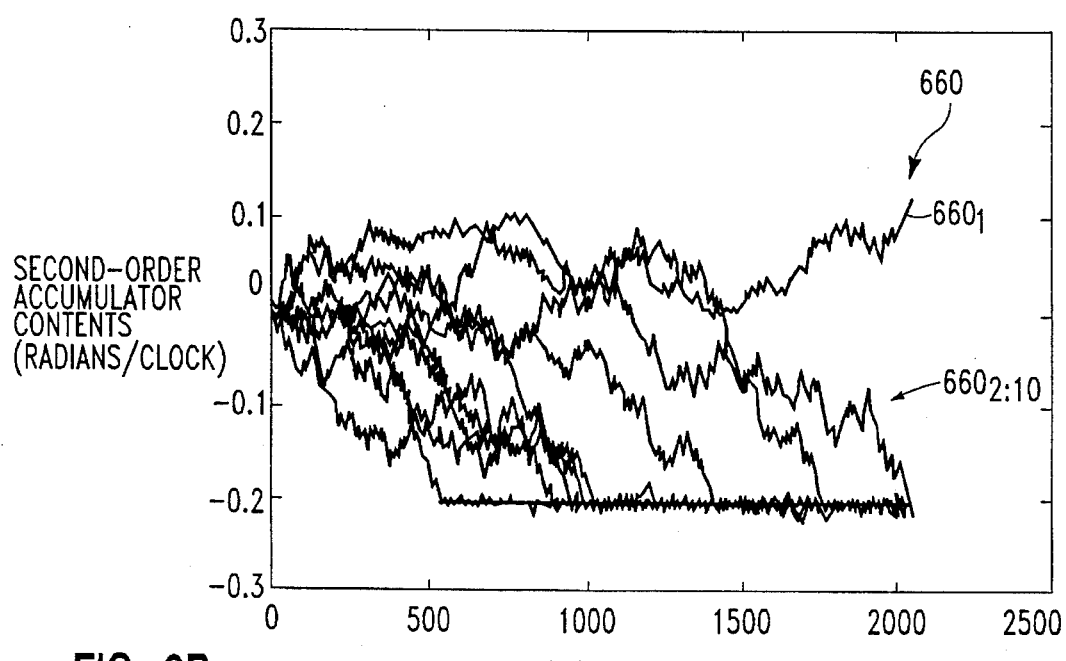
FIG. 6B graphically depicts traces 660 for ten separate simulated attempts at achieving a lock using both acquisition (simplified RC) and full slicing in accordance with my inventive teachings for 200K received QAM symbols.

FIG. 6B graphically depicts, for ten simulated operating conditions set forth below, traces 660 for ten separate attempts at achieving a lock using both acquisition (simplified RC) and full slicing in accordance with my inventive teachings for 200K received QAM symbols. As shown, only one attempt, represented by trace $660_1$, failed to achieve a lock within 200K symbols. The other nine attempts, represented by traces $660_{2:10}$, all achieved a lock and maintained that lock thereafter. In that regard, note the absence of any relatively large peaks, in FIG. 4C, at approximately 100K–150K symbols. As one can appreciate, once a lock was achieved through use of my inventive simplified RC slicing, accurate symbol detection occurred thereafter through the use of full slicing which advantageously maintained the lock condition.

While I have chosen to utilize the average error energy to set the mode of circuit 200, clearly, other error criteria and accompanying switching threshold value(s) can be used instead. For example and alternatively, the number of symbols, having an error energy less than a pre-determined amount or within a pre-determined range, that occurs during a pre-defined period could be used along with an appropriate threshold value to switch the mode. The amount, range and/or switching threshold values could also dynamically change based upon and adapt to a function of the current CNR of the received symbols.

FIG. 7 depicts an illustrative block diagram of average error energy determining circuit 700 and mode selection comparator circuit 530, both of which are employed within my inventive carrier recovery circuit 200.

As depicted, average error energy determining circuit 700 is formed of summer 710, magnitude squarer 720 and averager 730. Fully sliced symbols, $Z_{SL_F}$, are applied to a negative input of summer 710; while the de-rotated symbols, $Z_{REC}$, are applied to a positive input of the summer. A resulting complex error difference, $\epsilon$, between these symbols is generated by the summer and applied, via leads 715, to magnitude squarer 720. A resulting squared absolute value of this complex error is routed, via lead 725, to averager 730 which determines the average of this squared error and applies a resultant value as the average error energy $<|\epsilon|^2>$ to lead 735. This averager, as with others described herein, can be conventionally implemented as illustratively an IIR (infinite impulse response) filter, an FIR (finite impulse response) filter or just a periodically reset accumulator.

A signal representing the average error energy is then routed, as depicted in FIG. 7, to an input of mode selection comparator circuit 530 and specifically to one input (A) of comparator 750 situated therein. The switching threshold value is applied, via lead 545, to another input to circuit 530 and specifically to a second input (B) to comparator 750. The output of this comparator is the mode selection (MODE SELECT) signal that appears on lead 535. If multiple switching thresholds were to be used (as occurs in circuit 1000 shown in FIG. 10), then circuit 530 would utilize two comparators: one to compare the average error energy value to an acquisition threshold value and another to compare this error value to a tracking threshold value.

Figure 8:
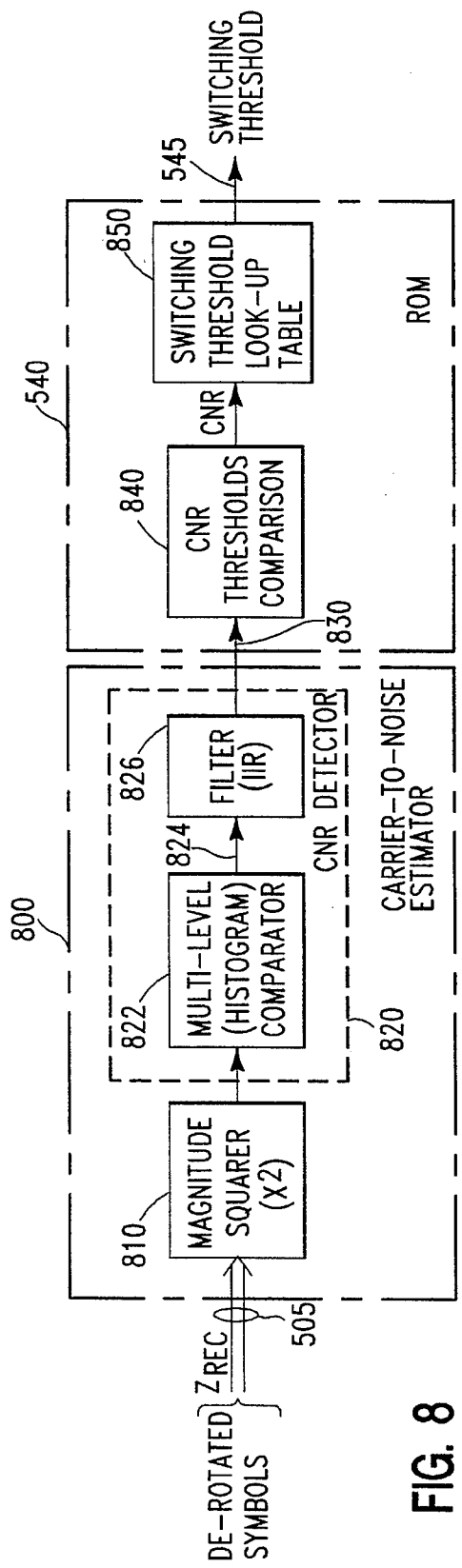
FIG. 8 depicts a block diagram of carrier-to-noise estimator circuit 800 and a functional diagram of the table look-up operations performed by read only memory (ROM) 540, both of which are also employed within inventive carrier recovery circuit 200 shown in FIG. 5.

FIG. 8 depicts a block diagram of carrier-to-noise estimator Circuit 800 and a functional diagram of the table look-up operations performed by read only memory (ROM) 540, both of which are also employed within inventive carrier recovery circuit 200.

Carrier-to-noise estimator 800 contains magnitude squarer 810 followed by CNR detector 820, that itself contains multi-level histogram comparator 822 and IIR filter 826. While this filter is shown as illustratively an IIR filter, this filter could alternatively be implemented as an FIR filter or just a periodically reset accumulator. In essence, to estimate CNR of received symbols, a histogram, based upon squared symbol magnitude values is determined with these values classified into appropriate bins. Symbol magnitudes of a QAM constellation, regardless of whether that constellation is locked or not, will fall into discrete rings and display a unique probability density function—provided, of course, all the symbol levels have been set (as noted above and as is ordinarily the case) to yield the same average signal power across the different QAM constellations being received. Advantageously, this function can be used to identify the size of the constellation as well as the CNR associated with the symbols in this constellation. To gain a detailed insight as to how this function can be used to determine QAM type and to a 16/32-QAM detector based thereon, the reader should refer to co-pending United States patent application entitled "A TECHNIQUE FOR AUTOMATICALLY DETECTING THE CONSTELLATION SIZE OF A QUADRATURE AMPLITUDE MODULATED (QAM) SIGNAL" from Frank A. Lane, filed on Aug. 20, 1993, and assigned Ser. No. 08/109,651, (hereinafter the "Lane" application), now U.S. Pat. No. 5,381,450 and which is incorporated by reference herein. In any event, the contents of two of these bins are then filtered with the results thereof, specifically a filtered probability density function represented by the contents, specifying the particular CNR of the received symbols.

Specifically, incoming de-rotated complex symbols, $Z_{REC}$, (although as noted above, equalized rotating symbols could alternatively be use) are applied, via leads 505, to magnitude squarer 810. This conventional element determines the magnitude squared of each symbol (i.e. this circuit squares the values of the in-phase and quadrature components and then adds the results together) which, in turn, is applied as input to CNR detector 820. Within the CNR detector, multi-level histogram comparator 822 classifies the squared magnitude values into appropriate bins (ranges). The comparator produces a "one" if a symbol falls within a desired bin. The desired magnitude bins for 16-QAM and 32-QAM are respectively shown as bins 910 and 930 in FIGS. 9A and 9B. Specifically, for 16-QAM, the desired bins occur between 0 and 4.0, and between 8.0 and 12.0; for 32-QAM, the desired bins occur between 0 and 4.0, and between 8.0 and 12.0. If symbols levels are appropriately chosen, as in practice, such that both the 16- and 32-QAM constellations would possess the same average signal power, then, bins 910 for 16-QAM would result from rings of $\sqrt{2}$ larger levels than those that would occur for 32-QAM. Therefore, in practice, for a 32-QAM signal having bins 930 of 0 to 4.0 and 8.0 to 12.0, a 16-QAM signal, having the same average signal power, would require bins of 0 to 8.0 and 16.0 to 24.0.

In any event, the resultant "ones" produced by comparator 822 are routed through IIR filter 826. The output of IIR filter 826 depends upon the CNR of the received symbols. Specifically, for 32-QAM at a relatively high CNR (e.g. 20 dB), all the symbols appearing on lead 505 which are to fall within inner two rings 431 and 433 shown in FIG. 4B, will actually reside there with the output of IIR filter 826, depicted in FIG. 8, being $12/32$ or 0.375. Similarly, for 16-QAM at a relatively high CNR, all the symbols that are to fall within inner ring 413 as well as middle ring 417, as depicted in FIG. 4A, will actually fall there with a resultant value of $12/16$ or 0.75 being produced by IIR filter 826, depicted in FIG. 8. As the CNR degrades, the output of the IIR filter decreases as additive noise causes an increasing number of symbols to fall outside their nominal bins. Accordingly, over several symbol intervals, fewer squared magnitude values will fall within the desired bins than had previously occurred at a higher CNR thereby causing the output of the IIR filter to correspondingly decrease. As such, the output of filter 826, i.e. a proportionate symbol count, will vary with the CNR of the received symbols, though numerically the value produced by the filter will not equal the CNR. Specifically, FIGS. 9C and 9D respectively depict, as graphs 950 and 970, the mean value output (after start-up transients have dissipated) of CNR detector 820 for the CNR, in decibels (dB), of the received 16- and 32-QAM symbols.

As shown in FIG. 8, the CNR estimate, in terms of a proportionate symbol count, produced by estimator 800 is applied, via lead 830, as an address input to ROM 540. As discussed above, this ROM effectively provides two functions: CNR threshold comparison 840 and switching threshold look-up 850. In particular, the output of the CNR estimator, being in terms of a proportionate symbol count, is compared (classified) against pre-determined CNR threshold values, i.e. a pre-set proportionate value associated with each different CNR, in order to map the proportionate value into a closest CNR value. The CNR value produced by function 840 is then used as an address into a look-up table of threshold values to select the switching threshold value(s) most appropriate to this CNR value. The resulting threshold value(s) is then applied to lead 545 as the switching threshold. The embodiment shown in FIG. 8 produces a single switching threshold value at a time; though for added stability, appropriately spaced-apart switching threshold values can be produced through the look-up table. In this instance (see specifically ROM 540 shown FIG. 10 and discussed in detail below), the table would produce two different switching threshold values: one (THRESH_ACQ) for use in the acquisition mode and another (THRESH_TRACK) for use in the tracking mode. Although functions 840 and 850 are shown separately, these functions can be readily combined into a single look-up table that stores switching threshold values as a function of proportionate symbol count. Clearly, ROM 540 could be replaced with appropriate dedicated logic to map the proportionate symbol count into the appropriate switching threshold value(s). Furthermore, while I have described CNR estimator 800 as utilizing the magnitude squared of the de-rotated symbols, this estimator could alternatively base its CNR estimate on the de-rotated symbols themselves or the input equalized (rotating) symbols (which occur before de-rotation) without the need to employ magnitude squarer 810.

Figure 10B:
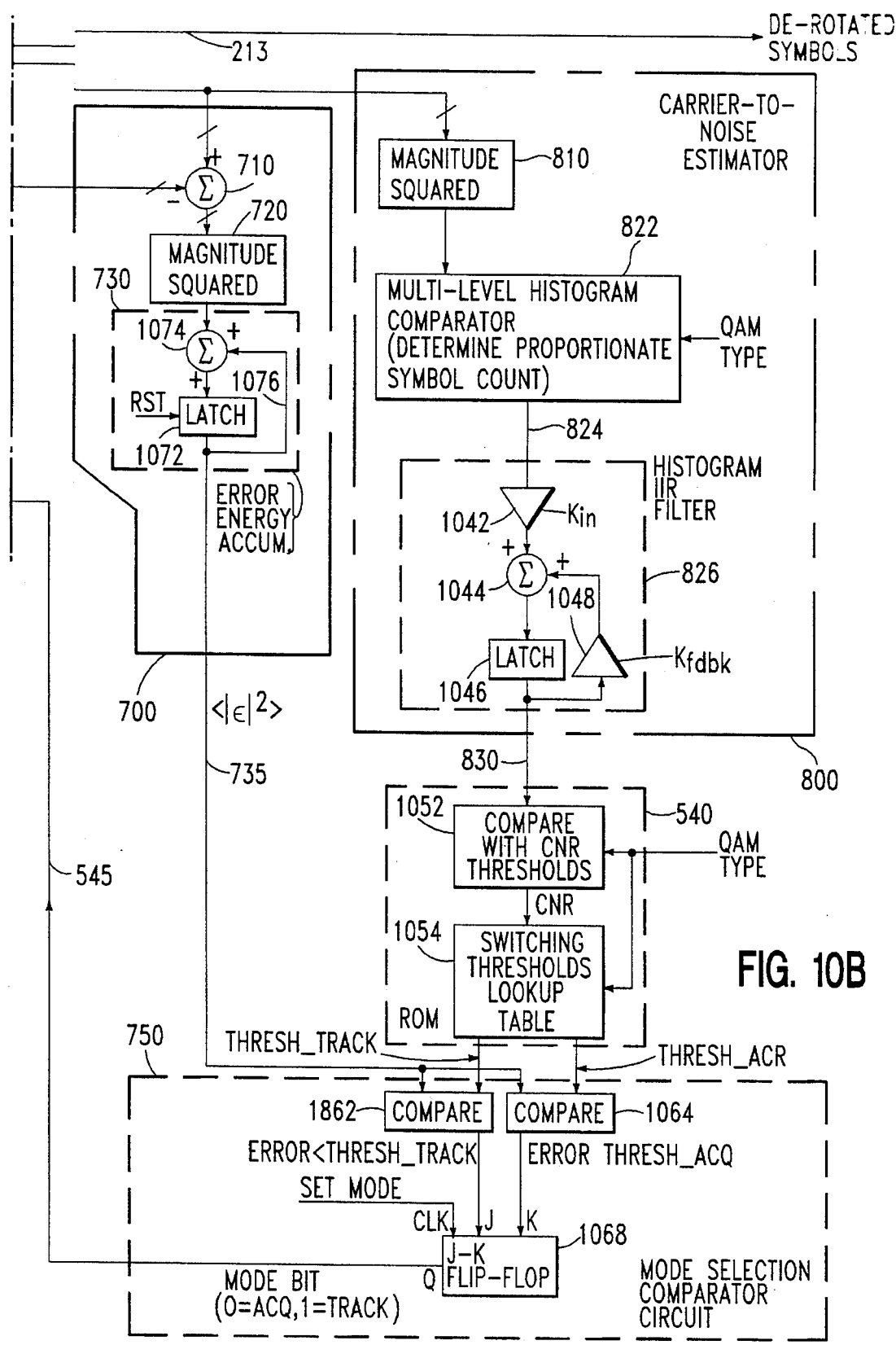

FIGS. 10A and 10B collectively depict a detailed block diagram of embodiment 1000 of my inventive carrier recovery circuit 200, shown in FIG. 5, but for use with multiple QAM constellations, such as illustratively 16 or 32-QAM, rather than just a single constellation as is the case with circuit 200. Not surprisingly, a high degree of similarity exists between the embodiment shown in FIGS. 10A and 10B and circuit 200 collectively shown in FIGS. 5, 7 and 8; however various differences do exist therebetween.

As one can appreciate, various gains and internal threshold values, including slicing, multi-level histogram comparison and switching, will all vary as a function of the particular QAM type being received. As such, to accommodate multiple constellations, embodiment 1000 possesses the capability, based on the QAM type, illustratively here 16- or 32-QAM, to access, among various pre-defined gains and internal thresholds, those that are particular to the specific QAM type, whether it be 16 or 32-QAM, then being received.

Specifically, a $16/32$-QAM detector (not specifically shown), preferably that described in the Lane application, provides a control signal that identifies the type of QAM signal then being received. Illustratively, this signal is asserted high (e.g. "1" level) for 32-QAM and de-asserted low (e.g. "0" level) for 16-QAM. This control signal is routed to acquisition and full slicers 1010 and 1020 to select the appropriate slicing thresholds used therein; to gain elements 1003, 1005, 1007 and 1011 in order to select the appropriate gains in each of these elements; to multi-level histogram comparator 822 to select the appropriate "bins" for use therein; and to ROM 540 to select the CNR threshold values and switching threshold values; all of which correspond to the particular QAM type (16 or 32) then being received.

Furthermore, as shown and to provide circuit stability, loop filter 240 may contain separate gain elements for the acquisition and track modes. As shown, filter 240 has a common second-order accumulator 1020 but utilizes two separate sets of two gain elements, labeled as "ACQ" and "FULL" in the first- and second-order paths. The individual gain elements in these paths are depicted as elements $K_1$ and $K_2$ to conform to that shown in FIG. 2. The QAM TYPE signal applied to these four gain elements, specifically elements 1003, 1005, 1007 and 1011, shown in FIG. 10, selects one of two pre-defined gain values that each of these elements is to provide, based upon the QAM type then being received. These gain values are all empirically determined. The outputs of two corresponding gain elements $K_1$, i.e. acquisition mode $K_1$ gain element 1003 and tracking mode (full) $K_1$ gain element 1007, are applied to corresponding inputs of multiplexer 1015. Similarly, the outputs of two corresponding gain elements $K_2$, i.e. acquisition mode $K_2$ gain element 1005 and tracking mode (full) $K_2$ gain element 1011, are applied to corresponding inputs of multiplexer 1017. Based upon the mode then in use, i.e. acquisition or tracking, these multiplexers route the output of the appropriate $K_1$ gain element onward to summer 1030 and the appropriate $K_2$ gain element onward to second-order accumulator 1020. In particular, the MODE SELECT signal produced by mode selection comparator circuit 750 and appearing on lead 545 defines the current operating mode. This signal is connected to the select (S) inputs of both multiplexers 1015 and 1017. Based upon the level of this signal (illustratively asserted high for the tracking mode, and de-asserted low for the acquisition mode), these multiplexers apply the output of the gain element (elements 1003 or 1007 for $K_1$, and elements 1005 or 1011 for $K_2$) for the mode then in use, from element $K_1$, to one input of summer 1030 or, from element $K_2$, to an input of second-order accumulator 1020.

Second-order accumulator 1020 performs integration. The input to this accumulator is routed to one input of summer 1021, the output of which feeds delay element 1025, with the output of the delay element being fed back, via path 1027, to another input of this summer. The contents of the delay element is the second-order accumulated output. The output of accumulator 1020 is applied to another input of summer 1030. The output of summer 1030 is the output of loop filter 240 and is routed to phase accumulator 250 to produce an accumulated (integrated) phase error signal, in the specific manner described above.

Acquisition (simplified RC) and full slicers 1010 and 1020 are highly similar (nearly identical) to acquisition and full slicers 510 and 220, shown in FIG. 5 and discussed above, but with one important difference: slicers 1010 and 1020, shown in FIG. 10, can selectively perform either 16- or 32-QAM slicing, rather than slicing for just a single constellation as is the case for slicers 510 and 220. This multi-constellation operation is accomplished through internal multiplexing within slicers 1010 and 1020, shown in FIGS. 10A and 10B, to select the appropriate threshold(s) based upon the particular constellation in use as specified by the QAM TYPE signal. Illustrative single and multi-constellation slicers are shown in FIGS. 11–14 and discussed in detail below.

The output of full slicer 1020 is applied, via lead 512 as symbols $Z_{sL_F}$, as an input to average error energy determining circuit 700. De-rotated symbols $Z_{REC}$ produced by de-rotator 210 constitute the other input to circuit 700. Within circuit 700, the difference between corresponding symbols $Z_{REC}$ and $Z_{sL_F}$ is determined through summer 710 with the magnitude squared of the resultant difference value then being determined by magnitude squarer 720. The resulting squared value produced by squarer 720 is applied to averager (error energy accumulator) 730. Within this averager, the incoming squared magnitude is applied as one input to summer 1074 with the current latched output of circuit 730 being fed back via lead 1076 and applied to another input of this summer. The output of the summer is latched into latch 1072 which is periodically reset to zero, over an averaging interval, by a appropriate RESET (RST) pulse (reset error energy accumulated pulse) produced by counter 1080. This counter is driven by a symbol clock pulse. The contents of latch 1072 are the average error energy value $<|e|^2>$. This value is applied, via lead 735, to mode selection comparator circuit 750.

As described in detail above, CNR Estimator circuit 800 determines the CNR in the received symbols. This circuit first, through magnitude squarer 810, determines the square of the magnitude of the de-rotated symbols $Z_{REC}$. The resulting squared value is then compared, by comparator 822, against pre-defined multi-level thresholds to determine the histogrammed distribution of these symbols. As described above, the distribution of these symbols, when appropriately filtered, yields a proportionate symbol count that is related, as shown in FIGS. 9C and 9D for illustratively 16- and 32-QAM, respectively, to the CNR of these symbols. Inasmuch as the thresholds vary with the particular QAM type then being received, the QAM TYPE signal selects, through, e.g., simple multiplexing, the group of multi-level thresholds appropriate to the QAM type then being received. The resulting proportionate count produced by comparator 822, shown in FIGS. 10A and 10B, is routed as input to Histogram IIR filter 826. This filter contains input gain element 1042 (having gain $K_{in}$), the output of which feeds a positive input of summer 1044. The output of the summer feeds latch 1046 the contents of which, in turn, are the output of the IIR filter and are also fed back, through gain element (providing a gain of $K_{fdbk}$) 1048, to another positive input of summer 1044. To provide an infinite impulse response function, gains $K_{in}$ and $K_{fdbk}$ both sum to 1.0 with the value of input gain $K_{in}$ being a small number, typically 0.0001 or so) and the value of feedback gain $K_{fdbk}$ being close to 1.0 (typically 0.9999 or so).

The proportionate symbol count provided as output by IIR filter 826 is routed, via lead 830, as input to ROM 540. This count, together with the QAM TYPE signal, collectively forms an input address to this ROM, and accesses the appropriate switching thresholds given the CNR for the particular type QAM signals then being received. For enhanced operational stability particularly in the presence of noise on the received symbols, ROM 540, through internal look-up table function 1054, generates two switching threshold values: an acquisition threshold, THRESH_ACQ, and a tracking threshold, THRESH_TRACK.

These two switching threshold values are applied to separate comparators 1062 and 1064. These comparators continuously and separately compare the average error energy value, for the received de-rotated symbols, that appears on lead 735 against these two switching threshold values. An output of comparator 1062, indicating that the average error energy value (ERROR) is less than the tracking switching threshold THRESH_TRACK, is applied to a J input of flip-flop 1068. Similarly, an output of comparator 1064, indicating that the average error energy value exceeds the acquisition switching threshold THRESH ACQ, is applied to a K input of this same flip-flop. The contents of this flip-flop are set by a set error mode (SET) pulse which is produced by counter 1080 and is applied to a clock input to this flip-flop. This SET pulse occurs at an end of every average error accumulation period but just before the RESET pulse occurs.

Operationally speaking, if the average error energy falls below the tracking switching threshold, then the J input is high. Alternatively, if the average error energy exceeds the acquisition switching threshold then the K input to this flip-flop is high. Now, if the flip-flop is initially set to the acquisition mode (output Q is de-asserted low), then if the average error energy decreases below the tracking switching threshold, then at the end of the accumulation period, flip-flop 1068 is set to the tracking mode at which point the Q output is asserted high. This has the effect of changing the mode of the carrier recovery circuit from acquisition to tracking and hence changing to full from simplified RC slicing. Alternatively, if flip-flop 1068 has been set into the lock mode with the Q output being high, then, if the average error energy increases beyond the acquisition threshold at the end of an accumulation period, then, at the occurrence of a next SET pulse, the flip-flop is reset with the Q output being de-asserted low. This has the effect of changing the mode of the carrier recovery circuit from the tracking mode back to the acquisition mode with simplified RC rather than full slicing occurring as a result. If the switching thresholds are established such that the average error energy exceeds the acquisition switching threshold but is less than the tracking switching threshold, then both the J and K inputs to flip-flop 1068 are asserted high. In this case, the flip-flop toggles at the next SET pulse to provide proper operation, i.e. when in the acquisition mode, the flip-flop then switches the mode of the carrier recovery circuit into the tracking mode; and when in the tracking mode, the flip-flop switches the mode of the carrier recovery circuit into the acquisition mode.

As discussed above, the level at the Q output of flip-flop 1068 is the MODE SELECT signal which, in turn, when applied, via lead 545, to multiplexer 520 and to multiplexers 1015 and 1017 selects the slicer that is then to be used along with the appropriate loop filter gains. When circuit 1000 (or circuit 200 shown in FIG. 5) is utilized within receiver 5 shown in FIGS. 1A and 1B, the MODE SELECT signal is also applied as the CARRIER LOCK signal, shown therein, to lead 54.

Although embodiment 1000 has been described as handling illustratively 16 and 32-QAM type signals, this embodiment can be readily extended to handle more than two different QAM signals by merely increasing the number of different pre-defined gain and internal threshold values, such as slicing and histogram threshold values, over which a selection is made. In this case, the QAM TYPE signal, rather than being a single bit, would likely be a coded multi-bit value, typically binary, 1 out of n, to specifically identify the particular QAM constellation then being received out of n permissible types.

4. QAM Slicers

I will now discuss various illustrative slicers that can be used in the embodiments 200 and 1000 of my inventive carrier recovery circuit. In seriatim, I will address a 16-QAM full slicer, a 32-QAM full slicer, an simplified RC acquisition slicer that can be used with either 16- or 32-QAM signals, and a simplified RC acquisition slicer that can be used with both 16- and 32-QAM signals.

Figure 11:
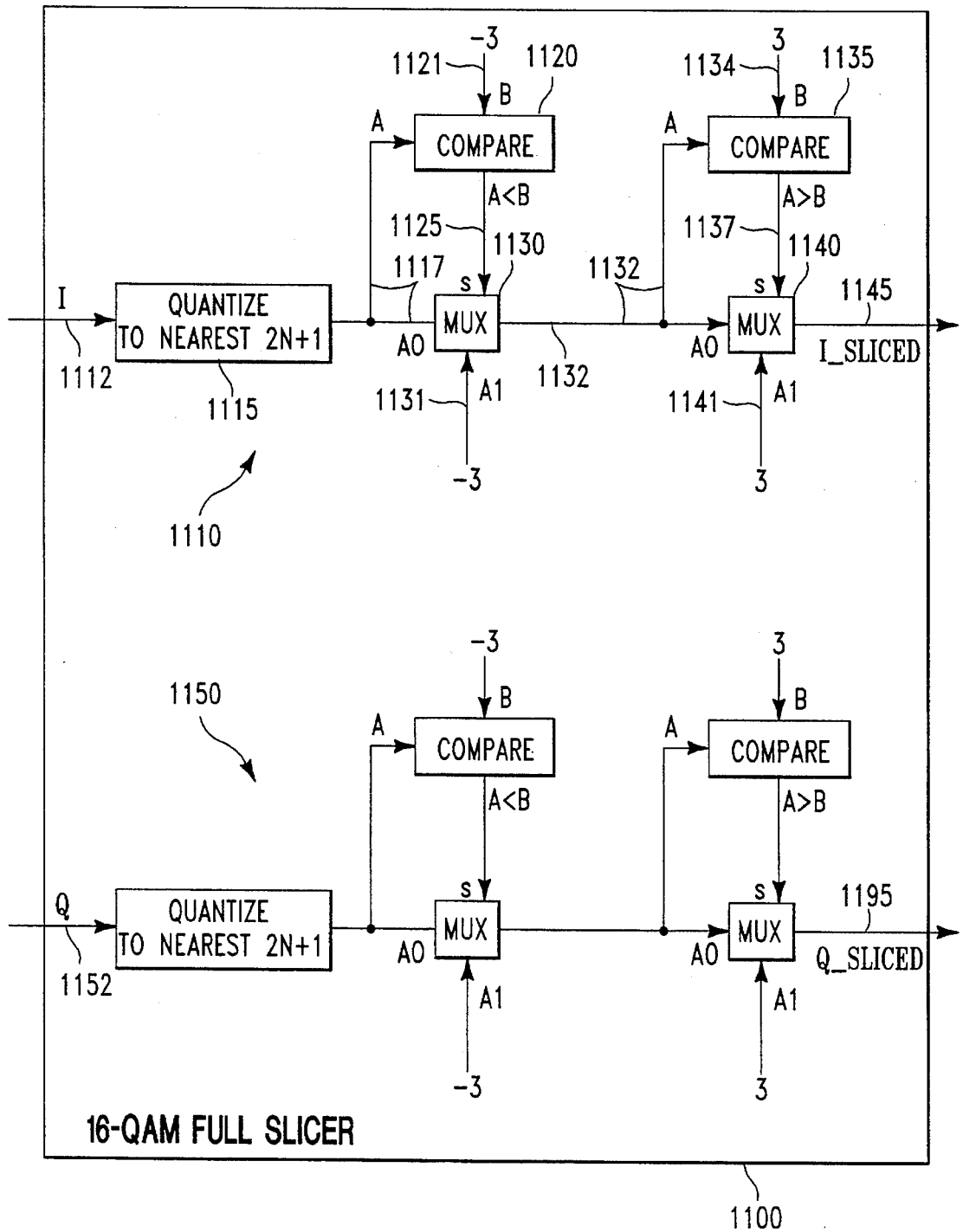
FIG. 11 depicts a simplified block diagram of 16-QAM full slicer 1100.

FIG. 11 depicts a simplified block diagram of 16-QAM full slicer 1100.

As shown, slicer 1100 contains two identical slicers 1110 and 1150 which separately slice the in-phase (I) and quadrature (Q) components of an incoming 16-QAM complex signal. Each of these slicers first quantizes the magnitude of an incoming value into the nearest 2N+1 value and then produces that quantized value as an output value provided the former value does not exceed either a positive or negative limit, specifically ±3, else the particular limit value, instead of the quantized value, is produced as the output value. The output sliced values (I_SLICED and Q_SLICED) are applied, by slicers 1110 and 1150, to output leads 1145 and 1195, respectively. Since slicers 1110 and 1150 are identical, then, for brevity, only slicer 1110 will be described in detail.

With respect to slicer 1110, each incoming value of the in-phase component is routed, via input lead 1112, to quantizer 1115 which quantizes this incoming value to a nearest 2N+1 value. A resulting quantized value is then routed, via lead 1117, to one input (A) of comparator 1120 and to one input (A0) of multiplexer 1130. Comparator 1120, in conjunction with multiplexer 1130, compares the quantized value against a negative limit value, −3, and, if the quantized value is equal to or negatively exceeds this limit value, maps the quantized value into this limit value as output; otherwise, the quantized value itself is produced as the output value.

In particular, through comparator 1120, this quantized value is compared to negative limit value −3 which is applied, via lead 1121, to another input (B) of the comparator. If the quantized value is less (i.e. more negative) than the limit value −3, then the comparator asserts a high level on its A<B output. As a result, this high level, applied via lead 1125 to a select (S) input of multiplexer 1130, causes this multiplexer to route the −3 limit value applied, via lead 1131, to multiplexer input A1 to an output of the multiplexer and onward to lead 1132. Alternatively, if the quantized value applied to input A0 of the multiplexer is equal to or less negative than the limit value −3, then the comparator de-asserts its output signal low which, when applied as the select signal to multiplexer 1130, causes the multiplexer to route the quantized value, applied via lead 1117 to input A0 of this multiplexer, and in lieu of the limit value, to the output of the multiplexer and onward to lead 1132.

In a highly similar fashion, the value appearing on lead 1132 is routed to one input (A) of comparator 1135 and to one input (A0) of multiplexer 1140. Comparator 1135, in conjunction with multiplexer 1140, compares the quantized value now against a positive limit value, +3, and, if the quantized value is equal to or positively exceeds this limit value, maps the quantized value into this limit value as output; otherwise, the quantized value itself is produced as the output value.

In particular, through comparator 1135, this quantized value is compared to positive limit value +which is applied, via lead 1134, to another input (B) of this comparator. If the quantized value is less than or equal to the limit value +3, then the comparator de-asserts a low level on its A>B output. As a result, this low level, applied via lead 1137 to a select (S) input of multiplexer 1140, causes this multiplexer to route the quantized value applied, via lead 1132, to multiplexer input A0 to an output of the multiplexer and onward to output lead 1145. Alternatively, if the quantized value applied to input A0 of the multiplexer exceeds the positive limit value +3, then the comparator asserts its output signal high which, when applied as the select signal to multiplexer 1140, causes the multiplexer to route the limit value +3, applied via lead 1141 to input A1 of this multiplexer, and in lieu of the quantized value, to the output of the multiplexer and onward to output lead 1145.

Figure 12:
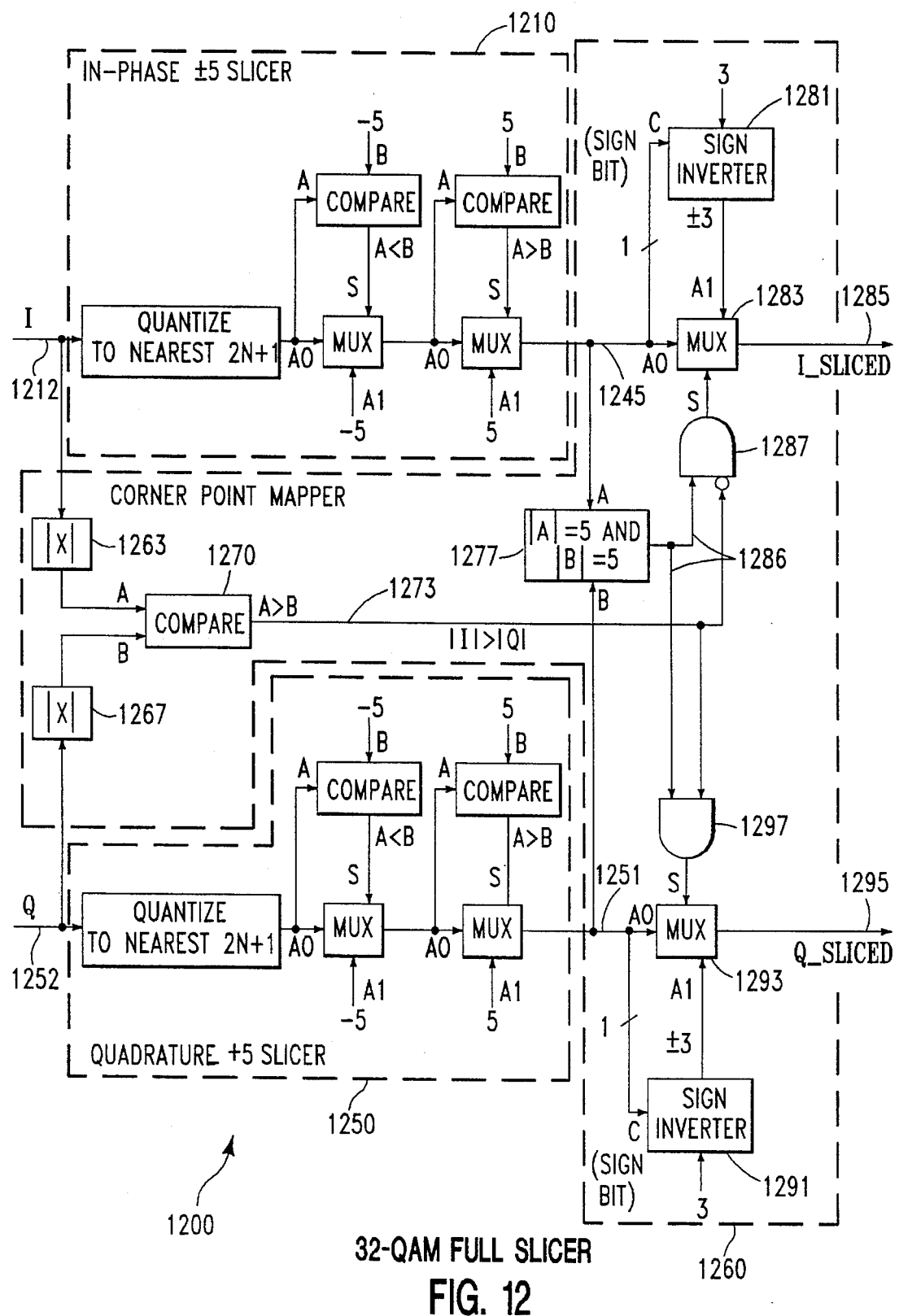
FIG. 12 depicts a simplified block diagram of 32-QAM full slicer 1200.

FIG. 12 depicts a simplified block diagram of 32-QAM full slicer 1200. As shown, slicer 1200 contains two identical ±5 slicers 1210 and 1250 and corner point mapping circuit 1260. Slicers 1210 and 1250 separately slice incoming in-phase (I) and quadrature (Q) QAM symbol components, that appear on input leads 1212 and 1252, respectively, into quantized values limited to ±5. In particular, each of these slicers first quantizes the magnitude of an incoming value into the nearest 2N+1 value and then produces that quantized value as an output value provided the former value does not exceed either a positive or negative limit, specifically ±5, else the particular limit value, instead of the quantized value, is produced as the output value. The output sliced values (I_SLICED and Q_SLICED) are applied, by slicers 1210 and 1250, to leads 1245 and 1251, respectively. The sliced values produced by these slicers, along with the incoming symbols, are fed as inputs to corner point mapping circuit 1260. Inasmuch as the 32-QAM constellation omits, as discussed below, corner point symbols which, if present, would square-off the constellation, mapping circuit 1260 maps high-magnitude symbols into the appropriate corner points that do exist within the constellation. The resulting in-phase and quadrature values produced by mapping circuit 1260 and appearing on output leads 1285 and 1295 are the sliced in-phase (I_SLICED) and quadrature (Q_SLICED) symbol values. Since each of slicers 1210 and 1250 is identical to slicer 1110 shown in FIG. 11, though with a only different limit value being used, and otherwise functions as described above, I will only discuss corner point mapping circuit 1260 in detail.

To readily understand the need for mapping circuit 1260, the reader should now refer back to FIG. 4B which depicts the 32-QAM constellation. This constellation, represented by the two-dimensional distribution of the 32-QAM alphabet, with each symbol being denoted by an "x", has a cross-shape (not rectangular or square), as outlined by dot-dashed boundary 440. Corner points 445, specifically 445₁, 445₂, 445₃ and 445₄ (each denoted by a dashed "X") which are produced by slicers 1210 and 1255, shown in FIG. 12, are missing from the 32-QAM constellation. Accordingly, the sliced symbols that would otherwise lie outside of boundary 440, shown in FIG. 4B, must be mapped into the corner points which actually do exist within the constellation. For example, incoming symbols which would lie in an upper-right quadrant but outside of boundary 440 and above or below 45 degree line 460 need to be mapped to constellation points situated on the boundary but located, as indicated by arrows 451 or 455, to the left of or below line 460. This mapping over all four constellation quadrants is the function provided by mapping circuit 1260 shown in FIG. 12.

With the above in mind, within mapping circuit 1260 shown in FIG. 12, circuits 1263 and 1267 separately determine the magnitude of the incoming in-phase and quadrature components that appear on input leads 1212 and 1252, respectively. The resulting magnitude values are applied to corresponding inputs (A and B) of comparator 1270 to ascertain which component, i.e. in-phase or quadrature, is larger than the other. The output of this comparator is applied, via lead 1273, to one input of AND gate 1297 and, through an inverter, to one input of AND gate 1287.

To determine whether any sliced symbol lies outside of the 32-QAM constellation thereby requiring mapping into maximal valued constellation points, the sliced values generated by slicers 1210 and 1250 are routed to corresponding inputs (A and B) of magnitude comparator 1277. This comparator generates an absolute value of these sliced values and determines whether the absolute value of both sliced values (in-phase and quadrature) equal five. If both values equal five, then the complex symbol lies outside of the constellation boundary and needs to be mapped into an appropriate point on the boundary. If, however, one of the sliced values is less than five, then the complex symbol lies within the constellation. In this case, mapping is not necessary.

Specifically, if the magnitude of either sliced value is less than five, then the output of magnitude comparator 1277 is de-asserted low. The comparator output is routed, via lead 1286, to another input of both AND gates 1287 and 1297. With these inputs de-asserted low, AND gates 1287 and 1297 both produce low leveled output signals. The outputs of AND gates 1287 and 1297 provide select (S) signals to control multiplexers 1283 and 1293, respectively. The sliced in-phase and quadrature values appearing on leads 1245 and 1251 are applied to a corresponding input (A0) of these multiplexers. When the output of both of these AND gates is de-asserted low, then multiplexers 1283 and 1293 route the sliced values applied to their input A0 onward to output leads 1285 and 1295 as sliced output values I_SLICED and Q_SLICED.

However, if the sliced symbol lies outside of the constellation boundary, i.e. has in-phase and quadrature components whose absolute values both equal 5, then that symbol needs to be mapped into the nearest constellation point. The appropriate constellation points are (3,5), (5,3), (−5,3), (−3, 5), (−3,−5), (−5,−3), (3,−5) or (5,−3). The selection of the nearest constellation point is made based upon whether the absolute value of the actual incoming in-phase component exceeds the absolute value of the actual incoming quadrature component and also upon the signs of the corresponding sliced values, these signs being those of the incoming values themselves. In particular, for any incoming symbol, if the magnitude of the actual incoming in-phase component exceeds the magnitude of the actual quadrature component, then the corresponding sliced in-phase value remains at ±5 and the corresponding sliced quadrature value is altered to have a magnitude of 3 and a sign corresponding to its quantized value (and contrarily if the magnitude of the actual quadrature component exceeds the magnitude of the in-phase component).

To generate the proper mapped value, the value 3 is applied as a data input to sign inverters 1281 and 1291. A single sign bit is taken from the sliced in-phase and quadrature values appearing on leads 1245 and 1251 and applied to a control (C) input of sign inverters 1281 and 1291, respectively. As a result, the outputs of inverters 1281 and 1291 have a magnitude of 3 but with a sign respectively determined by the sign of the corresponding sliced in-phase and quadrature values. In the event that the in-phase component exceeds the quadrature component, and each has a sliced value with a magnitude of 5, then both inputs to AND gate 1297 are high. As a result, the output produced by this AND gate is asserted high which, in turn, as a select (S) signal to multiplexer 1293 causes this multiplexer to route the output of sign inverter 1291 as a sliced quadrature symbol to output lead 1295. This has the effect of reducing the sliced quadrature value to a magnitude of 3 and with an appropriate sign. However, here, the sliced in-phase value is not reduced. In this case, the signal appearing on lead 1286 and routed from comparator 1277 to one input of AND gate 1287 is asserted high. However, the signal appearing on lead 1273 from comparator 1270, which is asserted high, is inverted to a low level prior to being applied to another input to this AND gate. Accordingly, the output of AND gate 1287 is de-asserted low which, when applied as a select signal to multiplexer 1283, causes that multiplexer to route the sliced in-phase value, i.e. having a magnitude of 5 and an appropriate sign, onward to output lead 1285. Alternatively, if for any incoming QAM symbol, the magnitude of its actual in-phase component equals or is less than the magnitude of the actual quadrature component, but the magnitude of both corresponding sliced values equals 5, then the output of comparator 1270 is de-asserted low and the sliced in-phase value, rather than the quadrature value, is reduced to 3 but with an appropriate sign. In this case, the magnitude of the quadrature value remains at 5 with an appropriate sign.

Figure 13:
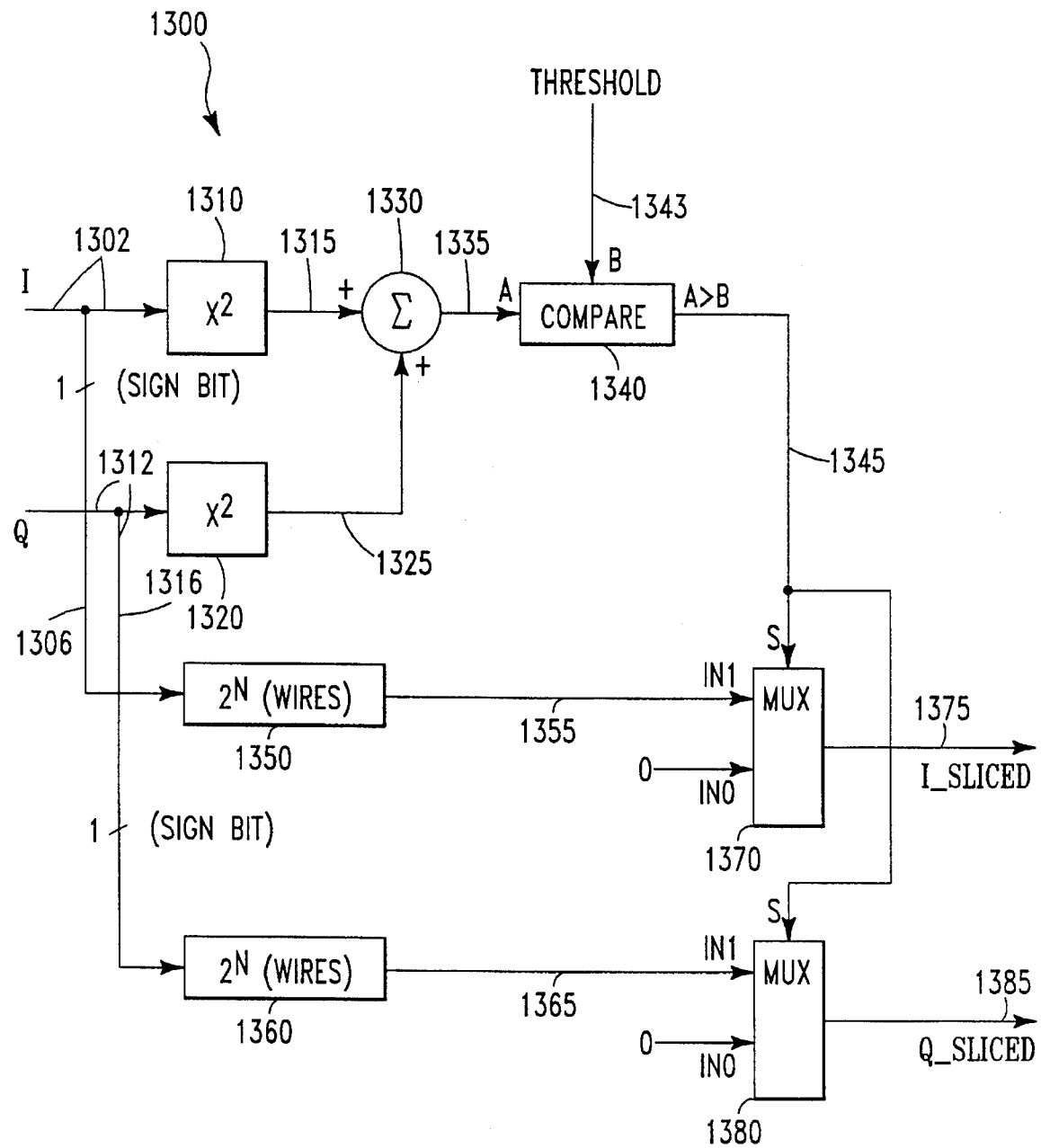
FIG. 13 depicts a simplified block diagram of 16- or 32-QAM acquisition slicer 1300 that utilizes simplified RC slicing.

FIG. 13 depicts a simplified block diagram of 16- or 32-QAM acquisition slicer 1300 that performs simplified RC slicing. The only difference in using this slicer for either 16- or 32-QAM is the value of a slicing threshold applied thereto. Slicer 1300 extracts the sign bit of the incoming in-phase and quadrature components. If the sum of the squared values of these components exceeds a pre-defined threshold value associated with the constellation in use, then the resulting sliced in-phase and quadrature values routed to outputs I_SLICED and Q_SLICED are simply corresponding pre-defined binary values ($2^N$) with their particular sign bits set to match those of the incoming in-phase and quadrature components; else, the output for both sliced component values is simply set to zero.

In particular, the in-phase (I) and quadrature (Q) components of an incoming QAM symbol, to be sliced using simplified RC slicing, are applied to slicer 1300 via corresponding input leads 1302 and 1312. Within this slicer, these components are first routed to squarers 1310 and 1320 which generate the square of the magnitude of each of these components. Since the symbol magnitude squared is used, the symbols applied to slicer 1300 can be taken before or after de-rotation. However, in the context of determining the quadrant of an incoming symbol, as discussed below, de-rotated symbols need to be applied, via input leads 1302 and 1312, to acquisition slicer 1300. In any event, the resulting squared magnitudes, appearing on leads 1315 and 1325, are then added together by summer 1330. A resulting summed value appearing on lead 1335 is applied to one input (A) of comparator 1340. This comparator compares the summed value against a pre-defined slicing threshold value which is applied, via lead 1343, to another input (B) of the same comparator. The output signal produced by comparator 1340 is routed, via lead 1345, as a select (S) signal to multiplexers 1370 and 1380. If the sum exceeds the threshold, then one of four pre-defined points (which being arbitrated points need not be actual points in the transmitted constellation) are produced by slicer 1300 as the sliced value. The particular arbitrated point that is produced, in any one instance, has I and Q components with signs given by that of their corresponding input (I and Q) components and corresponding pre-defined magnitudes, such as illustratively $2^N$, where N is a pre-defined integer. As such, the resulting arbitrated point represents a quadrant in the constellation in which the current de-rotated symbol exists. In particular, the sign bits of the in-phase and quadrature components are extended, via corresponding single-bit leads 1306 and 1316, to an input of corresponding elements 1350 and 1360, respectively, which provide pre-defined binary values with a sign bit determined by their corresponding input bits. For a simple implementation, these binary values are simply pre-defined powers of two ($2^N$). In this instance, for example, the sign bit appearing on lead 1306 of the in-phase (I) component appearing on leads 1302 would be routed within element 1350 to the (N+2)th output bit. The remaining N+1 output bits are pre-defined and formed of a 1 followed by N zeroes For example, a value of 8, which is $2^3$, is implemented within element 1350 by extending a sign bit, S, into binary word S1000 which in two's complement form takes on either an appropriate value 01000 binary which is +8 decimal or 11000 binary which is –8 decimal. The resulting binary word produced by element 1350 is applied, via leads 1355, to input IN1 of multiplexer 1370. The quadrature (Q) component is handled in an identical manner to produce a pre-defined arbitrated value to input IN1 of multiplexer 1380. Accordingly, the value of the arbitrated point collectively applied to the IN1 input of multiplexers 1370 and 1380 is a scaled version of the points (1, 1), (1,–1), (–1, 1) or (–1,–1). For 16- or 32-QAM, N may be set to four, thereby yielding (±4,±4) as the four arbitrated points. Of course, other factors than mere powers of two can be used; however, doing so would require a more complex implementation of elements 1350 and 1360 than that just described. A zero-valued input is applied to another input (IN0) to each of these two multiplexers. With this arrangement, whenever the summed value appearing on lead 1335 is less than or equals the threshold value appearing on lead 1343, comparator 1340 de-asserts its output signal low which, in turn, causes each of multiplexers 1370 and 1380 to produce zero values as I_SLICED and Q_SLICED output values on leads 1375 and 1385, respectively. Alternatively, if the summed squared magnitude exceeds the threshold value, then comparator 1340 asserts its output signal high which, when being applied as the select signal, to multiplexers 1370 and 1380 causes these multiplexers to route the arbitrated point collectively appearing at IN1 of both multiplexers onward to output leads 1375 and 1385 as sliced values I_SLICED and Q_SLICED, respectively. The slicing threshold applied to lead 1343 is empirically determined with different values being used for 16 or 32-QAM.

Figure 14:
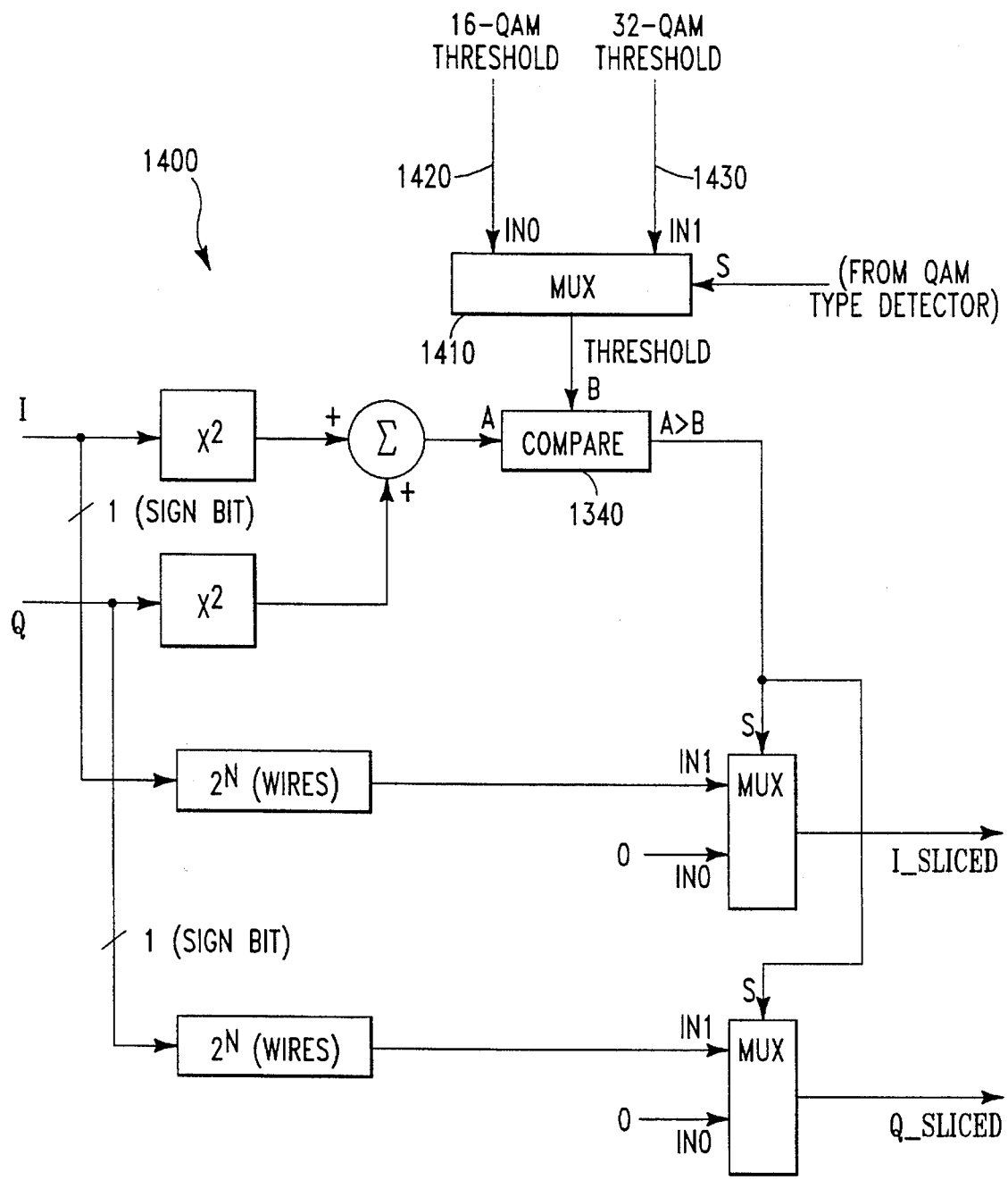
FIG. 14 depicts a simplified block diagram of 16/32-QAM acquisition slicer 1400 utilized within carrier recovery circuit 200 shown in FIG. 10 and which also utilizes simplified RC slicing.

FIG. 14 depicts a simplified block diagram of $^{16}\!/_{32}$-QAM acquisition slicer 1400 utilized within carrier recovery circuit 200 shown in FIG. 10. The only difference between slicers 1300, shown in FIG. 13, and 1400, shown in FIG. 14, is the inclusion of multiplexer 1410 to select, in response to the QAM TYPE signal, the slicing threshold for either 16- or 32-QAM, and apply the selected threshold to input B of comparator 1340. As a result, slicer 1400 can handle either of two different constellations based upon the status of the QAM TYPE signal. Since in all other respects, slicer 1400 operates in the same fashion as does slicer 1300, shown in FIG. 13 and discussed above, slicer 1400 will not be described in any further detail herein.

5. Multi-level Histogram Comparator for 32-QAM signals

Figure 9A:
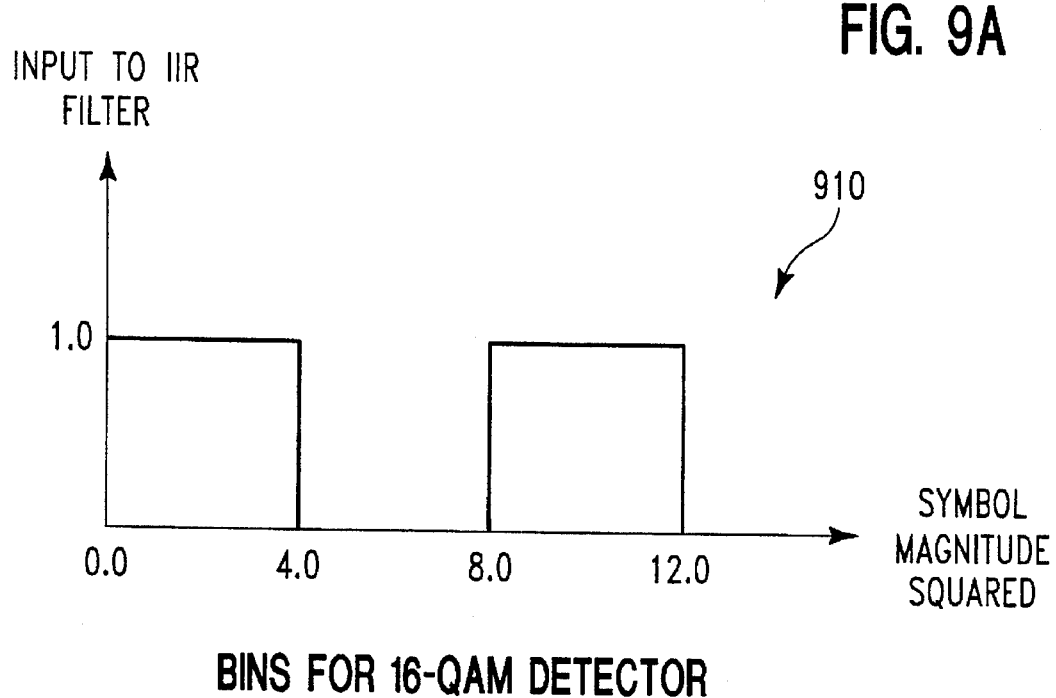
FIG. 9A depicts numeric "bins" 910 that are employed within CNR detector 820 for use with 16-QAM and employed within carrier-to-noise estimator 800 shown in FIG. 8.
Figure 9B:
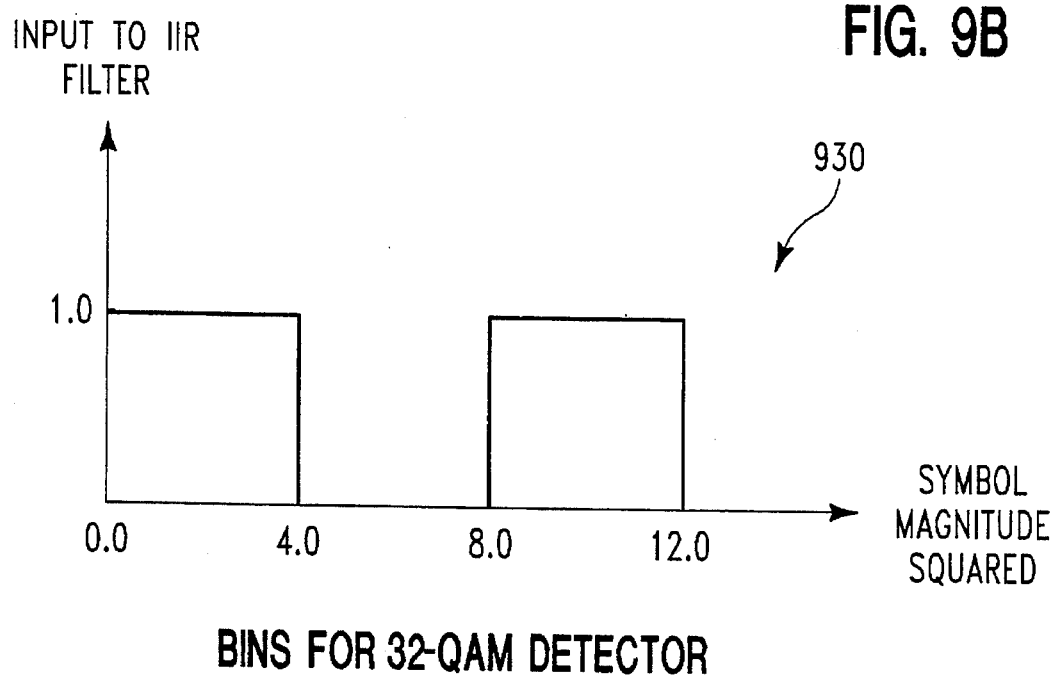
FIG. 9B depicts numeric "bins" 930 that are employed within CNR detector 820 for use with 32-QAM and employed within carrier-to-noise estimator 800 shown in FIG. 8.
Figure 15:
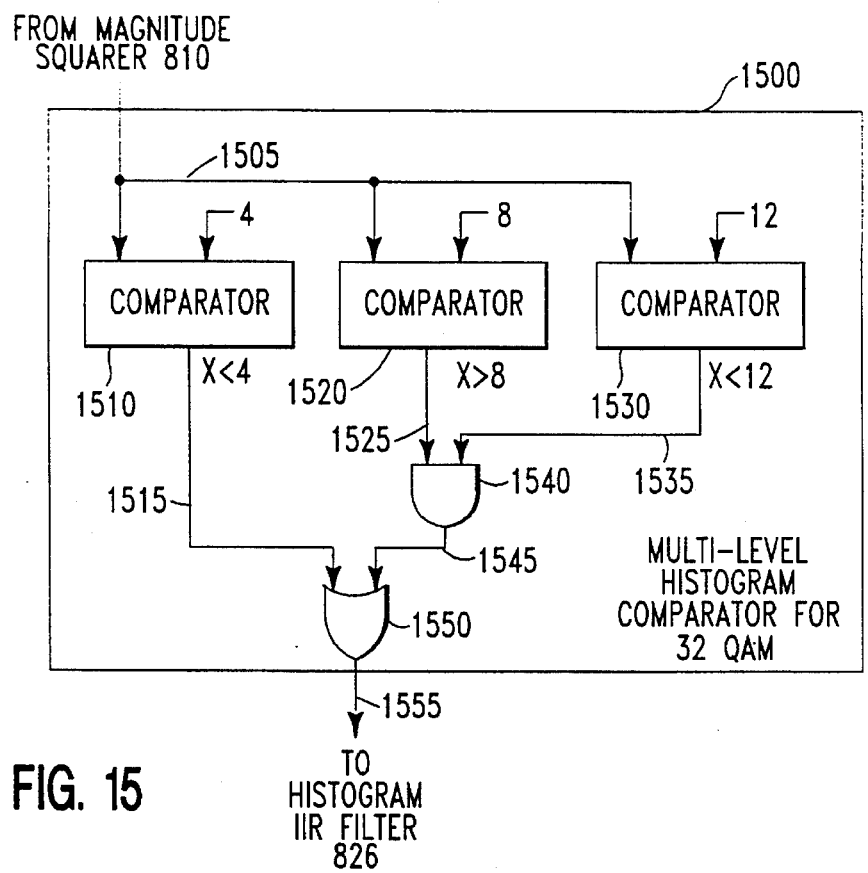
FIG. 15 depicts a simplified block diagram of an embodiment 1500 of multi-level histogram comparator 822, shown in FIG. 10, but for use with 32-QAM.

FIG. 15 depicts a simplified block diagram of an embodiment 1500 of multi-level histogram comparator 822, shown in FIG. 10, but for use with 32-QAM. As discussed above, multi-level histogram comparator 822 classifies squared symbol magnitude values into appropriate bins. The comparator produces a "one" if a symbol falls within a desired bin. For 32-QAM, the desired bins (as shown in FIG. 9B) occur between the values: 0 and 4.0, and between 8.0 and 12.0. As shown in FIG. 15, the output of comparator 822 is applied as input to Histogram IIR filter 826.

In order to perform this classification, comparator 1500 utilizes three separate comparators 1510, 1520 and 1530, each of which classifies symbol magnitudes into one of three groups. In particular, incoming squared magnitude values, from magnitude squarer 810 (shown in FIGS. 8 and 10), are applied, via lead 1505 shown in FIG. 15, as one input to each of comparators 1510, 1520 and 1530. Comparator 1510, through a fixed range value of 4.0 being applied to another input thereof, determines whether each incoming squared magnitude value is less than 4.0. If the squared magnitude is less than four, then this comparator asserts its (X<4) output signal, appearing on lead 1515, high. Inasmuch as this lead is applied as one input to OR gate 1550, this high level assertion propagates through OR gate 1550 to output lead 1555 of comparator 1500.

Comparators 1520 and 1530, in conjunction with AND gate 1540, determine whether each incoming squared magnitude value falls between 8.0 and 12.0. Specifically, comparator 1520 compares each incoming squared magnitude value against a fixed range value of 8.0 and produces a high level if this value is greater than 8.0. Comparator 1540 compares each incoming squared magnitude against a fixed range value of 12.0 and produces a high level if this value is less than 12.0. The levels produced by both comparators 1520 and 1530 are routed, via corresponding leads 1525 and 1535, to separate respective inputs of AND gate 1540. Consequently, this gate will produce a high level ("1") if the squared magnitude value falls in the bin lying between 8.0 and 12.0. The output of AND gate 1540 is applied, via lead 1545, to another input of OR gate 1550. Consequently, whenever a squared magnitude value is classified into the 8.0∝12.0 bin, a "1" is produced at the output of OR gate 1550 and applied to output lead 1555.

The same basic histogram comparator can be used for other constellations, such as 16-QAM, though the comparison ranges would need to change accordingly, and, depending upon the size of the constellation, so might the number of such separate ranges (bins) into which squared magnitude values need to be classified.

6. Simulated Performance Results

As shown in FIG. 6B and discussed above, my inventive carrier recovery circuit is able to consistently achieve a carrier lock more reliably than has occurred with conventional carrier recovery circuits. In that regard, the experimental simulated results shown in FIG. 6B, as noted above, indicate a carrier lock was achieved in nine out of ten attempts (traces $660_{2:10}$) and within 200K received symbols. In each of these attempts, the carrier lock, once achieved, was accurately maintained thereafter. Traces $660_{1:10}$ were generated under the following simulated operating conditions: the input passband signal was set to have an carrier-to-noise ratio of 15 dB, gains $K_1$ and $K_2$ were respectively set to 0.2 and 0.002, and a frequency offset was set to 0.1 radians/clock cycle.

To further illustrate the operation of my inventive carrier recovery circuit, FIGS. 16A–16F each graphically depicts simulated performance results, e.g., averaged error energy and scaled second-order accumulator contents, of carrier recovery circuit 1000 for various different operating conditions. These figures show optimum thresholds to use under different CNR conditions for switching between the acquisition and tracking modes. As described above, the output of CNR detector 820 (see FIG. 8) is used, in conjunction with ROM 540, to automatically select the proper switching threshold value(s) based upon the CNR.

Figure 16A:
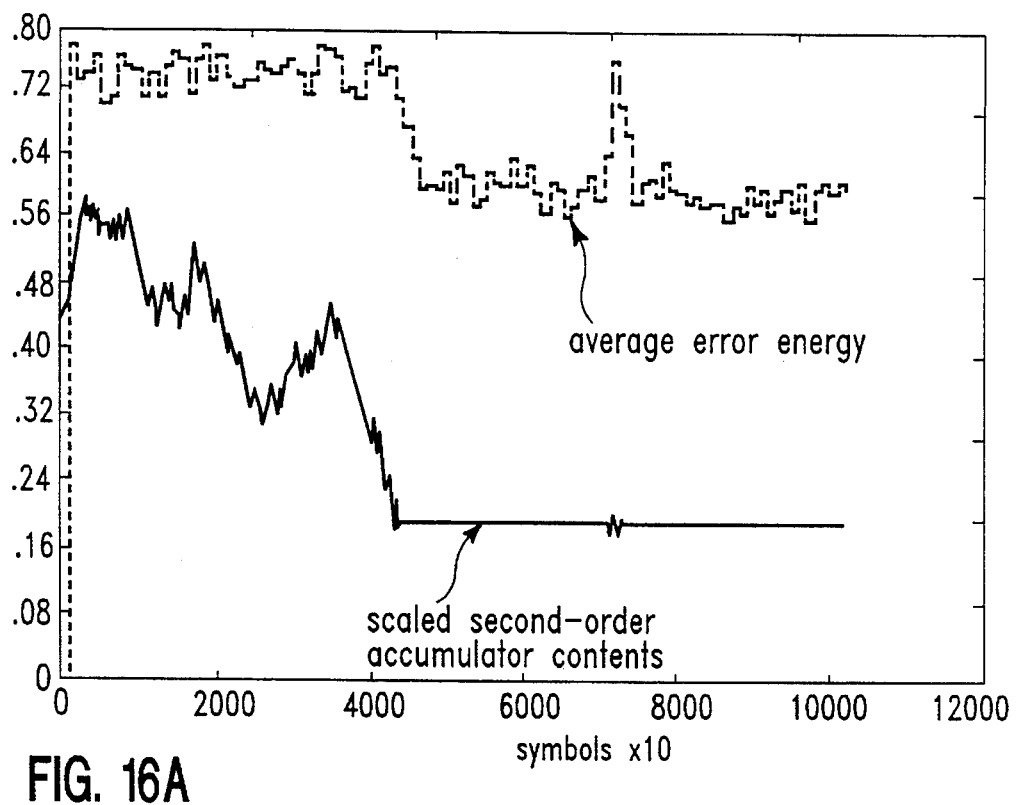
FIGS. 16A–16F each graphically depicts simulated performance results, e.g., averaged error energy and scaled second-order accumulator contents, of my inventive carrier recovery circuit 1000 for various different operating conditions.
Figure 16B:
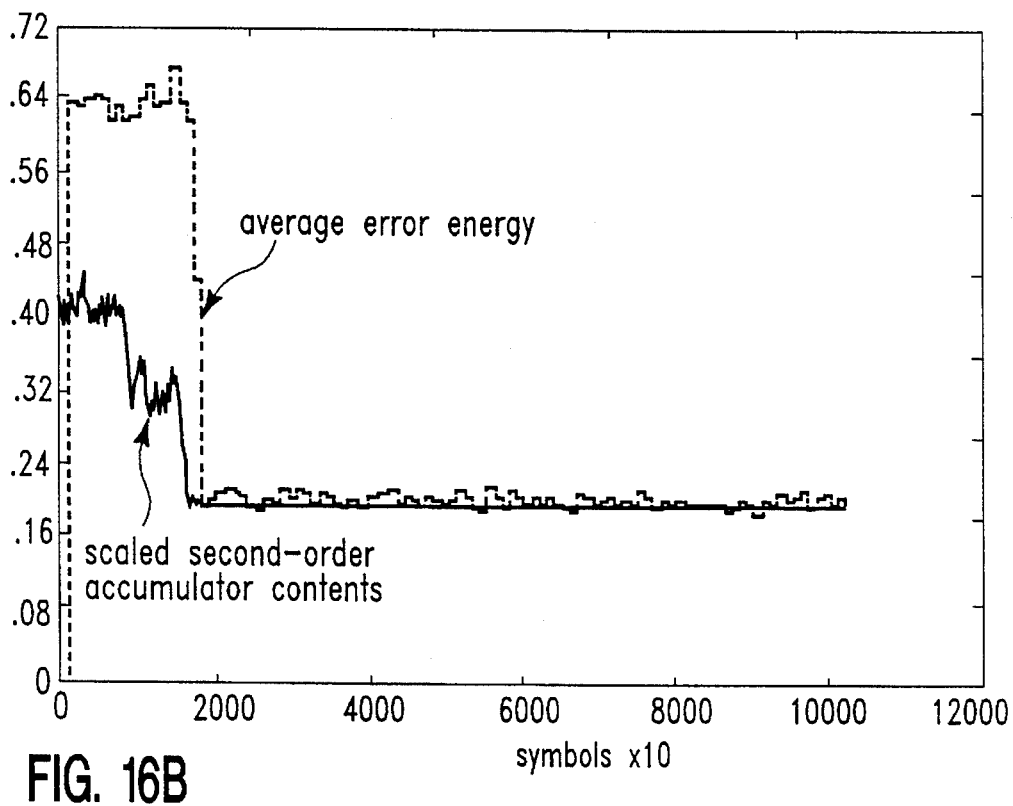

In this regard, FIGS. 16A and 16B graphically depict, for 32-QAM operation, the average error energy and scaled second-order accumulator contents at CNRs of 14 and 20 dB, respectively, when my inventive carrier recovery circuit is allowed to enter the lock mode at which point full constellation slicer 220 (see FIG. 5) is used in producing the phase error. As can be seen from FIGS. 16A and 16B, once a lock occurs, the average error energy decreases appreciably. Note the pronounced decrease in the average error energy, shown in FIG. 16B, that resulted, for a 20 dB CNR, once a lock occurred.

Figure 16C:
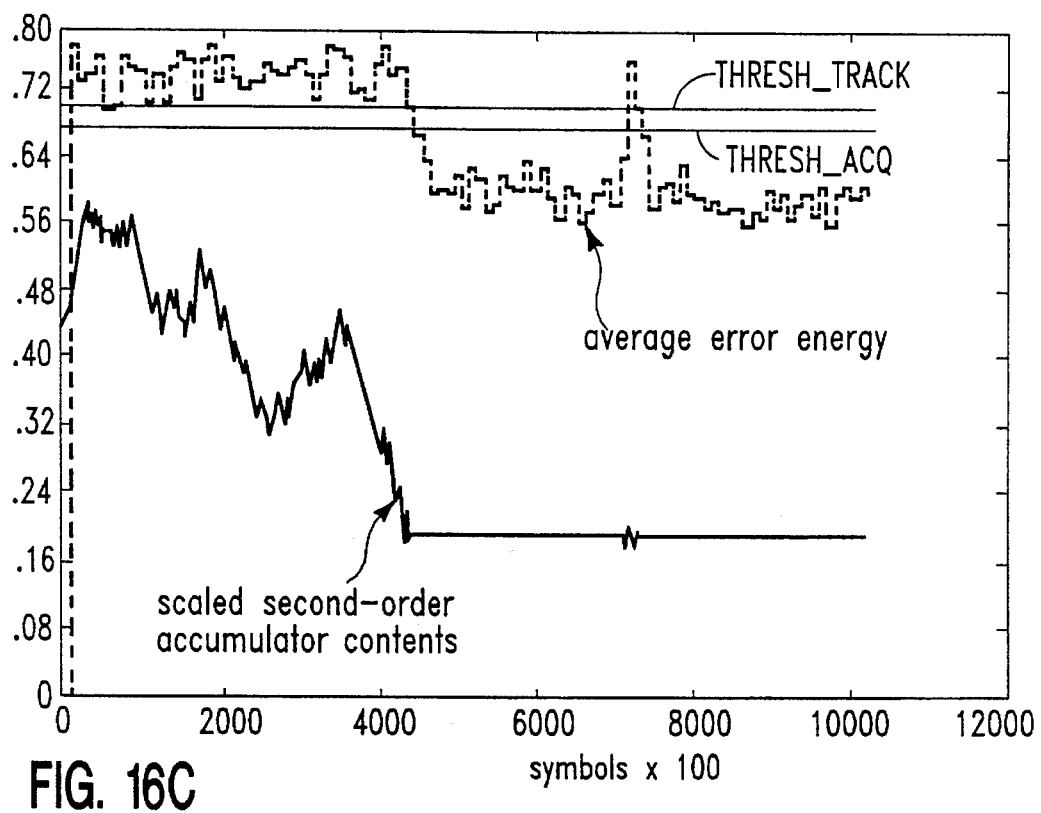
Figure 16D:
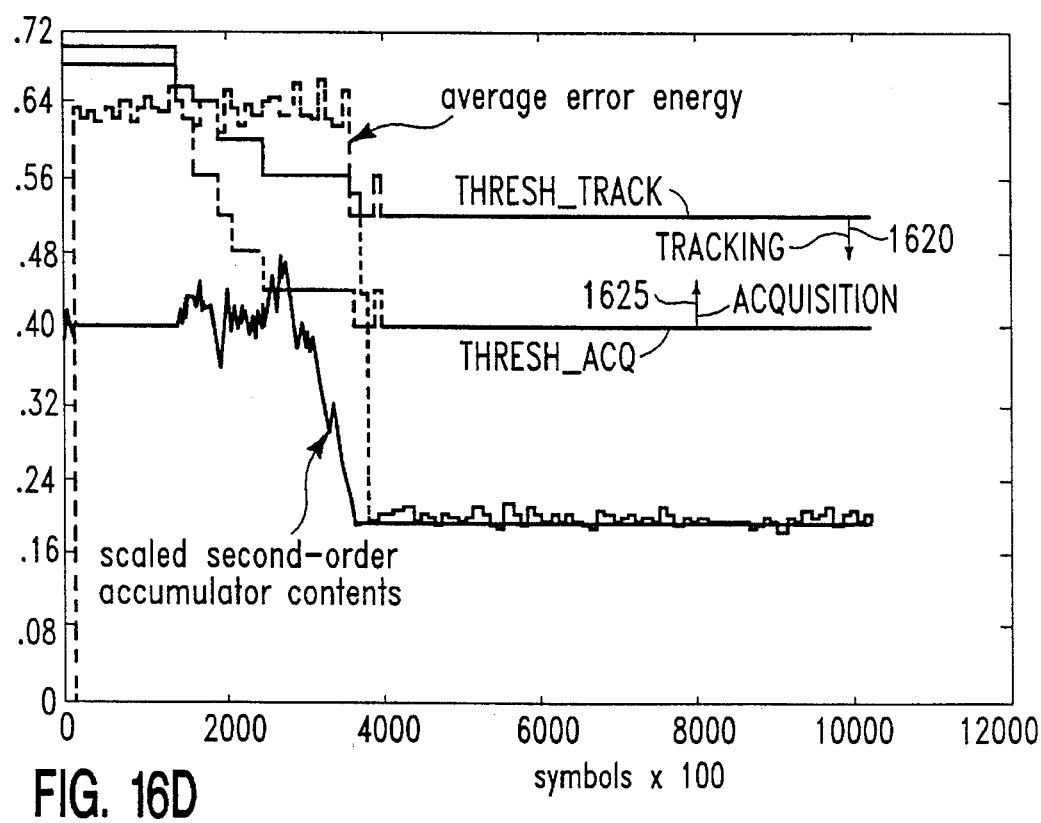

FIGS. 16C and 16D graphically depict the use of different acquisition and tracking switching threshold values as well as for CNRs of 14 and 20 dB, respectively, for 32-QAM operation. As shown, these two figures also illustrate the expected behavior of the threshold values themselves given the changing CNR.

The two switching threshold values that resulted at 20 dB CNR are spaced apart as shown in FIG. 16D. Here, when the carrier recovery circuit is operating in the acquisition mode, then the average error energy would need to increase in the direction of arrow 1625 to at least equal the tracking switching threshold value before the circuit would change modes from acquisition to tracking. Alternatively, if this circuit were operating in the tracking mode, then the average error energy would need to decrease in the direction of arrow 1620 until the error energy at least equals the acquisition switching threshold value in order for the circuit would switch its mode back to the acquisition mode.

Rather than being spaced as shown in FIG. 16D, the acquisition and tracking thresholds that result for a 14 dB CNR take on a narrower spacing as that shown in FIG. 16C. Here, an indeterminate region exists between the acquisition and tracking modes. In particular, if the average error energy exceeds both thresholds, i.e. numerically greater than the value of the tracking threshold (THRESH_TRACK), my inventive carrier recovery circuit switches into the acquisition mode. If the average error energy is less than both thresholds, i.e. numerically less than the value of the acquisition threshold (THRESH_ACQ), then the circuit switches into the tracking mode. Now, if the average error energy lies between the two threshold values, then, owing to the action of flip-flop 1068 (see FIG. 10), the circuit merely toggles between the two modes whenever a mode decision is made. Nevertheless, once the circuit obtains a carrier lock and enters the tracking mode, the average error energy does decrease.

Figure 16E:
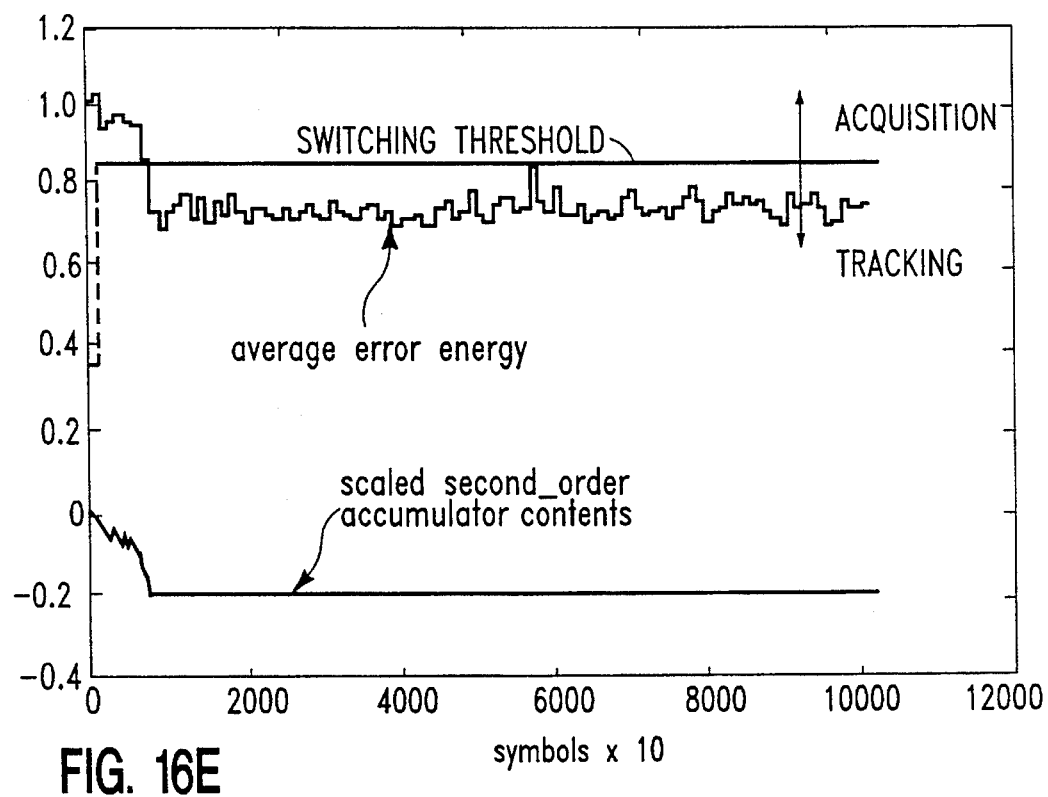
Figure 16F:
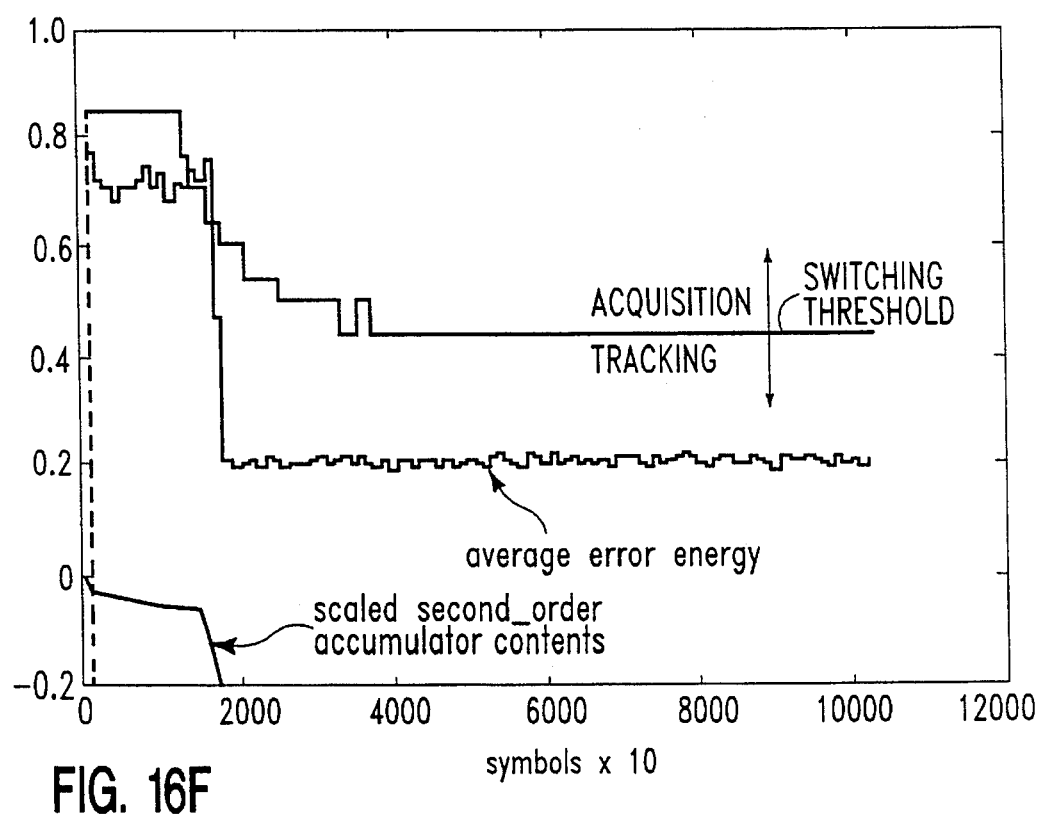

FIGS. 16E and 16F graphically depict, for 16-QAM operation and equal acquisition and tracking switching threshold values, the average error energy and scaled second-order accumulator contents for CNRs of 10 and 17 dB, respectively. Again, note the change in the switching threshold values that occurred in each instance for the current CNR. For the graphs shown in these two figures, the simulated operating conditions were taken to be: normalized frequency offset of 0.1 radians/clock cycle and a common set of loop gains, for both the acquisition and tracking loop filters, of $K_1$ of 0.2 and $K_2$ of 0.0002.

As can be seen from FIGS. 16C–16F, the acquisition and tracking switching threshold values (regardless of whether they utilize the same or different values) gradually converge to levels that are appropriate to the current CNR.

7. Improvement through "Dead-banding"

I have found that the performance of my inventive carrier recovery circuit can be further enhanced through the use of "dead-banding". Here, a received symbol is taken as "dead", i.e. no error signal is generated and hence no further decision-directed adaptation occurs in the carrier recovery loop, if either the absolute value of the in-phase component less its sliced value or the absolute value of the quadrature component less its sliced value is greater than a pre-defined threshold. This threshold is also empirically determined.

Figure 17:
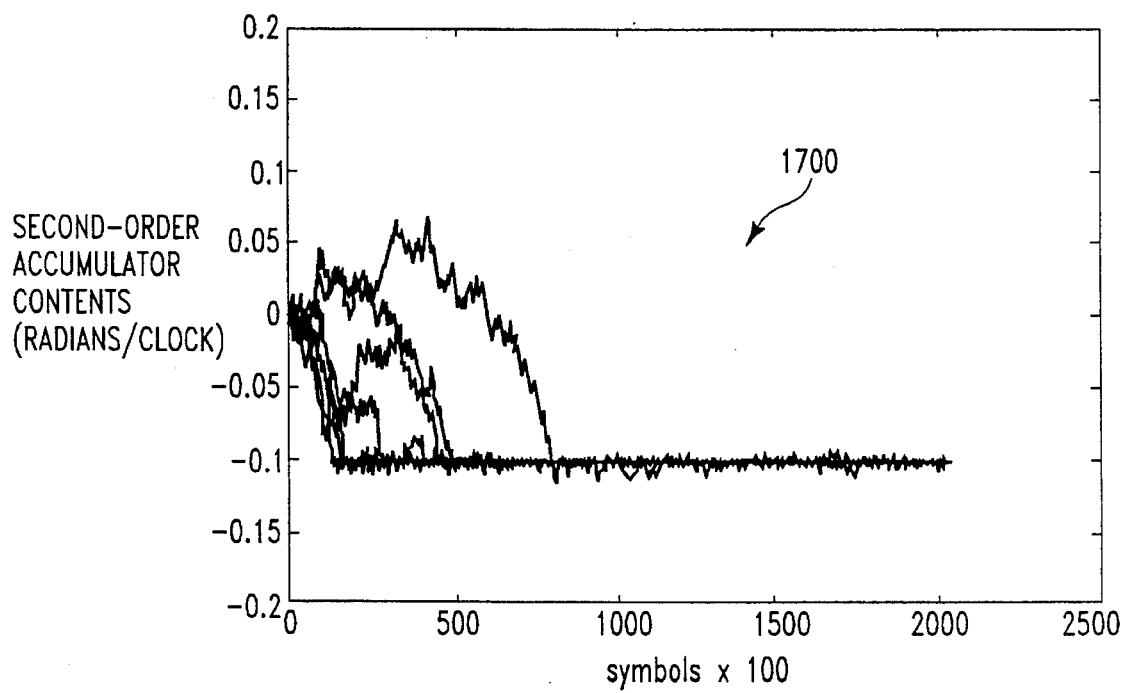
FIG. 17 graphically depicts traces 1700 for ten separate simulated attempts at achieving a lock using both acquisition and full slicing for 200K received QAM symbols and with "dead-banding" used to further improve performance, all in accordance with my inventive teachings.

FIG. 17 graphically depicts traces 1700 for ten separate attempts at achieving a lock using both acquisition (simplified RC) and full slicing for 200K received QAM symbols and with dead-banding used to further improve performance, all in accordance with my inventive teachings. Here, the same sets of loop gains were used for both acquisition and tracking modes with gain values $K_1$ and $K_2$ set to 0.2 and 0.002, respectively. The CNR of the incoming QAM symbols was set to 15 dB. A frequency offset of 0.1 radians was also set. As can be seen, a carrier lock was quickly achieved within 100K symbols for all ten attempts and in a much shorter time than that generally required for the attempts depicted in FIG. 6B. Also, as shown in FIG. 17, once the carrier lock was achieved, that lock was maintained in a relatively clean and stable manner thereafter.

By now those skilled in the art clearly recognize that my inventive carrier recovery circuit can advantageously function with any one of a number of different QAM constellations. One such circuit, depending upon the status of a QAM TYPE signal, can easily adapt itself, through the selection of, e.g., proper internal threshold values, to any such constellation then being received. As such, my inventive carrier recovery circuit finds ready application in a QAM receiver, and particularly within a passband QAM demodulator, that can receive and automatically handle any one of a number of different incoming QAM constellations, such as illustratively 16, 32 and 64-QAM.

Furthermore, though I have described the acquisition slicer as slicing each de-rotated symbol, $Z_{REC}$, the resulting sliced symbols, as noted above, are only used during the acquisition mode. At other times, these sliced symbols, produced by the acquisition slicer, are ignored. Accordingly, this slicer could alternatively be operated only during the acquisition mode. However, this type of operation is implementationally more complex than that described above and, for that reason, may not be preferred.

Although various embodiments which incorporate the teachings of my present invention have been shown and described in detail herein, those skilled in the art can readily devise many other varied embodiments that still incorporate these teachings.

I claim:

1. In a communications receiver, apparatus for recovering a carrier signal from a received signal and for producing de-rotated symbols therefrom, said apparatus comprising:

means, responsive to an incoming stream of symbols obtained from said received signal and to a reference carrier signal, for producing a stream of de-rotated symbols;

tracking slicing means for converting each one of said de-rotated symbols into a corresponding first sliced value so as to define a stream of first sliced values, wherein each of said first sliced values defines a corresponding symbol in a pre-selected constellation;

acquisition slicing means for converting ones of said de-rotated symbols into corresponding second sliced values, wherein each one of said second sliced values is specified by a pre-defined attribute of a corresponding one of said de-rotated symbols;

means, operative in response to a mode select signal, for comparing said each one of said de-rotated symbols to a corresponding one of selectively either said first or second sliced values in order to generate a phase error signal;

means, operative in response to said stream of first sliced values and to said stream of de-rotated symbols, for producing a mode error signal;

means, responsive to said mode error signal and a switching threshold value, for producing said mode select signal; and means, responsive to said phase error signal, for generating said reference carrier.

2. The apparatus in claim 1 further comprising means for varying said switching threshold value in response to variations in either said de-rotated symbols or said incoming stream of symbols.

3. The apparatus in claim 2 wherein each one of said incoming and de-rotated symbols is a quadrature amplitude modulated (QAM) symbol with separate in-phase and quadrature components, each of said first and second sliced values is a complex value, and said reference carrier is a complex signal with separate in-phase and quadrature components.

4. The apparatus in claim 3 wherein said variations are changes in a carrier-to-noise (CNR) of either the stream of de-rotated symbols or said incoming stream of symbols.

5. The apparatus in claim 4 wherein said varying means comprises:

means for estimating the CNR of said stream of de-rotated symbols or said incoming stream of symbols so as to produce a CNR estimate; and means, responsive to said CNR estimate, for producing said switching threshold value.

6. The apparatus in claim 5 wherein said CNR estimating means comprises means for ascertaining whether said de-rotated symbols, said incoming stream of symbols or a magnitude squared value of either each of said de-rotated symbols or each symbol within said incoming stream of symbols falls within a group of pre-defined ranges and, in response thereto, providing the CNR estimate.

7. The apparatus in claim 6 wherein said switching threshold value producing means comprises a pre-defined look-up table.

8. The apparatus in claim 3 wherein said mode select signal specifies either an acquisition mode or a tracking mode and said mode select signal producing means comprises means for setting said mode select signal to specify said acquisition or tracking mode whenever said mode error signal respectively exceeds or is less than said switching threshold value, and said comparing means further comprises:

means for selecting, in response to said mode select signal, the corresponding one of said first or second sliced values so as to form a selected sliced value; and phase comparator means for comparing said selected sliced value against said each one de-rotated symbol to generate said phase error signal.

9. The apparatus in claim 8 wherein said sliced signal selecting means is a multiplexer and said phase comparator means comprises one half of a complex multiplier.

10. The apparatus in claim 3 wherein said mode error signal producing means comprises:

means for ascertaining a difference between each one of said de-rotated symbols and each corresponding one of said first sliced values;

means for determining a magnitude squared value of said difference; and means for averaging said magnitude squared difference value so as to produce an averaged error energy value as said mode error signal.

11. The apparatus in claim 3 wherein said tracking slicing means and said acquisition slicing means are each a two-dimensional quantizer.

12. The apparatus in claim 11 wherein said tracking slicing means separately comprises for the in-phase and quadrature components:

means for quantizing a corresponding component of each of said de-rotated symbols into one of a plurality of pre-defined quantized values; and means for comparing said one quantized value against pre-defined limit values and producing, in the event the quantized value has a magnitude less than the pre-defined limit values, said quantized value as a corresponding one of said first sliced values or, in the event the magnitude of the quantized value exceeds one of the limit values, the one limit value so exceeded as the corresponding one of said first sliced values.

13. The apparatus in claim 12 further comprising:

means, responsive to said corresponding one de-rotated symbol, for determining whether the corresponding one de-rotated symbol lies beyond a boundary of the pre-selected constellation; and means, in the event that the one de-rotated symbol lies beyond the boundary and in response to which one of the complex components of the one de-rotated symbol has a larger magnitude than the other, for mapping the complex components of the quantized value for the one corresponding de-rotated symbol into an appropriate QAM symbol situated on the constellation boundary and generating said appropriate QAM symbol, in lieu of said quantized value or said one limit value, as said corresponding one of the first sliced values.

14. The apparatus in claim 11 wherein said acquisition slicing means comprises:

means, responsive to an incoming one of the de-rotated symbols, for squaring magnitudes of corresponding in-phase and quadrature components of said one de-rotated symbol and for adding the magnitudes so squared together to form a resultant sum; and means for comparing said sum against a pre-defined acquisition slicing threshold value and for generating, in the event the sum exceeds the acquisition slicing threshold value, values for the corresponding in-phase and quadrature components which represent a quadrant in which the de-rotated symbol exists within the pre-selected constellation, and, in the event the sum is less than the acquisition slicing threshold, zero values for the corresponding in-phase and quadrature components.

15. The apparatus in claim 3 wherein said de-rotated symbols producing means is a complex multiplier.

16. The apparatus in claim 3 wherein said pre-selected constellation is one from a plurality of different pre-defined QAM constellations, and wherein said apparatus further comprises means, responsive to a QAM type signal, for changing said pre-selected constellation from any one constellation in said group to any other constellation in said group.

17. The apparatus in claim 16 wherein said pre-defined constellations comprise 16- and 32-QAM.

18. The apparatus in claim 17 wherein said pre-defined constellations further comprise 64-QAM.

19. In a communications receiver, apparatus for recovering a carrier signal from a received signal and for producing de-rotated symbols therefrom, said apparatus comprising:

means, responsive to an incoming stream of symbols obtained from said received signal and to a reference carrier signal, for producing a stream of de-rotated symbols;

tracking slicing means for converting each one of said de-rotated symbols into a corresponding first sliced value so as to define a stream of first sliced values, wherein each of said first sliced values defines a corresponding symbol in a pre-selected constellation;

acquisition slicing means for converting ones of said de-rotated symbols into corresponding second sliced values, wherein each one of said second sliced values is specified by a pre-defined attribute of a corresponding one of said de-rotated symbols;

means, operative in response to a mode select signal, for comparing said each one of said de-rotated symbols to a corresponding one of selectively either said first or second sliced values in order to generate a phase error signal;

means, operative in response to said stream of first sliced values and to said stream of de-rotated symbols, for producing a mode error signal;

means, responsive to said mode error signal and a switching threshold value, for producing said mode select signal;

means for varying said switching threshold value in response to variations in said de-rotated symbols; and means for generating said reference carrier in response to said phase error signal.

20. The apparatus in claim 19 wherein said variations are changes in a carrier-to-noise (CNR) of either the stream of de-rotated symbols or said incoming stream of symbols.

21. The apparatus in claim 20 wherein said varying means comprises:

means for estimating the CNR of said stream of de-rotated symbols or said incoming stream of symbols so as to produce a CNR estimate; and means, responsive to said CNR estimate, for producing said switching threshold value.

22. The apparatus in claim 21 wherein each one of said incoming and de-rotated symbols is a quadrature amplitude modulated (QAM) symbol with separate in-phase and quadrature components, each of said first and second sliced values is a complex value, and said reference carrier is a complex signal with separate in-phase and quadrature components.

23. The apparatus in claim 22 wherein said CNR estimating means comprises means for ascertaining whether said de-rotated symbols, said incoming stream of symbols or a magnitude squared value of either each of said de-rotated symbols or each symbol within said incoming stream of symbols falls within a group of pre-defined ranges and, in response thereto, providing the CNR estimate.

24. The apparatus in claim 23 wherein said switching threshold value producing means comprises a pre-defined look-up table.

25. The apparatus in claim 22 wherein said mode select signal specifies either an acquisition mode or a tracking mode and said mode select signal producing means comprises means for setting said mode select signal to specify said acquisition or tracking mode whenever said mode error signal respectively exceeds or is less than said switching threshold value, and said comparing means further comprises:

means for selecting, in response to said mode select signal, the corresponding one of said first or second sliced values so as to form a selected sliced value; and phase comparator means for comparing said selected sliced value against said each one de-rotated symbol to generate said phase error signal.

26. The apparatus in claim 22 wherein said mode error signal producing means comprises:

means for ascertaining a difference between each one of said de-rotated symbols and each corresponding one of said first sliced values;

means for determining a magnitude squared value of said difference; and means for averaging said magnitude squared difference value so as to produce an averaged error energy value as said mode error signal.

27. The apparatus in claim 22 wherein said tracking slicing means and said acquisition slicing means are each a two-dimensional quantizer.

28. The apparatus in claim 27 wherein said tracking slicing means separately comprises for the in-phase and quadrature components:

means for quantizing a corresponding component of each of said de-rotated symbols into one of a plurality of pre-defined quantized values; and means for comparing said one quantized value against pre-defined limit values and producing, in the event the quantized value has a magnitude less than the pre-defined limit values, said quantized value as a corresponding one of said first sliced values or, in the event the magnitude of the quantized value exceeds one of the limit values, the one limit value so exceeded as the corresponding one of said first sliced values.

29. The apparatus in claim 28 further comprising:

means, responsive to said corresponding one de-rotated symbol, for determining whether the corresponding one de-rotated symbol lies beyond a boundary of the pre-selected constellation; and means, in the event that the one de-rotated symbol lies beyond the boundary and in response to which one of the complex components of the one de-rotated symbol has a larger magnitude than the other, for mapping the complex components of the quantized value for the one corresponding de-rotated symbol into an appropriate QAM symbol situated on the constellation boundary and generating said appropriate QAM symbol, in lieu of said quantized value or said one limit value, as said corresponding one of the first sliced values.

30. The apparatus in claim 27 wherein said acquisition slicing means comprises:

means, responsive to an incoming one of the de-rotated symbols, for squaring magnitudes of corresponding in-phase and quadrature components of said one de-rotated symbol and for adding the magnitudes so squared together to form a resultant sum; and means for comparing said sum against a pre-defined acquisition slicing threshold value and for generating, in the event the sum exceeds the acquisition slicing threshold value, values for the corresponding in-phase and quadrature components which represent a quadrant in which the de-rotated symbol exists within the pre-selected constellation, and, in the event the sum is less than the acquisition slicing threshold, zero values for the corresponding in-phase and quadrature components.

31. The apparatus in claim 22 wherein said pre-selected constellation is one from a plurality of different pre-defined QAM constellations, and wherein said apparatus further comprises means, responsive to a QAM type signal, for changing said pre-selected constellation from any one constellation in said group to any other constellation in said group.

32. In a communications receiver, a method for recovering a carrier signal from a received signal and for producing de-rotated symbols therefrom, said method comprising the steps of:

producing, in response to an incoming stream of symbols obtained from said received signal and to a reference carrier signal, a stream of de-rotated symbols;

first converting each one of said de-rotated symbols into a corresponding first sliced value so as to define a stream of first sliced values, wherein each of said first sliced values defines a corresponding symbol in a pre-selected constellation;

second converting ones of said de-rotated symbols into corresponding second sliced values, wherein each one of said second sliced values is specified by a pre-defined attribute of a corresponding one of said de-rotated symbols;

comparing, in response to a mode select signal, said each one of said de-rotated symbols to a corresponding one of selectively either said first or second sliced values in order to generate a phase error signal;

producing, in response to said stream of first sliced values and to said stream of de-rotated symbols, a mode error signal;

producing, in response to said mode error signal and a switching threshold value, said mode select signal; and generating said reference carrier in response to said phase error signal.

33. The method in claim 32 further comprising the step of varying said switching threshold value in response to variations in either said de-rotated symbols or said incoming stream of symbols.

34. The method in claim 33 wherein each one of said incoming and de-rotated symbols is a quadrature amplitude modulated (QAM) symbol with separate in-phase and quadrature components, each of said first and second sliced values is a complex value, and said reference carrier is a complex signal with separate in-phase and quadrature components.

35. The method in claim 34 wherein said variations are changes in a carrier-to-noise (CNR) of either the stream of de-rotated symbols or said incoming stream of symbols.

36. The method in claim 35 wherein said varying step comprises the steps of:

estimating the CNR of said stream of de-rotated symbols or said incoming stream if symbols so as to produce a CNR estimate; and producing, in response to said CNR estimate, said switching threshold value.

37. The method in claim 36 wherein said CNR estimating step comprises the step of ascertaining whether said de-rotated symbols, said incoming stream of symbols or a magnitude squared value of either each of said de-rotated symbols or each symbol within said incoming stream of symbols falls within a group of pre-defined ranges and, in response thereto, providing the CNR estimate.

38. The method in claim 34 wherein said mode select signal specifies either an acquisition mode or a tracking mode and said mode select signal producing step comprises the step of setting said mode select signal to specify said acquisition or tracking mode whenever said mode error signal respectively exceeds or is less than said switching threshold value, and said comparing step further comprises the steps of:

selecting, in response to said mode select signal, the corresponding one of said first or second sliced values so as to form a selected sliced value; and comparing said selected sliced value against said each one de-rotated symbol to generate said phase error signal.

39. The method in claim 34 wherein said mode error signal producing step comprises the steps of:

ascertaining a difference between each one of said de-rotated symbols and each corresponding one of said first sliced values;

determining a magnitude squared value of said difference; and averaging said magnitude squared difference value so as to produce an averaged error energy value as said mode error signal.

40. The method in claim 34 wherein said first converting step separately comprises, for the in-phase and quadrature components, the steps of:

quantizing a corresponding component of each of said de-rotated symbols into one of a plurality of pre-defined quantized values; and comparing said one quantized value against pre-defined limit values and producing, in the event the quantized value has a magnitude less than the pre-defined limit values, said quantized value as a corresponding one of said first sliced values or, in the event the magnitude of the quantized value exceeds one of the limit values, the one limit value so exceeded as the corresponding one of said first sliced values.

41. The method in claim 40 further comprising the steps of:

determining, in response to said corresponding one de-rotated symbol, whether the corresponding one de-rotated symbol lies beyond a boundary of the pre-selected constellation; and in the event that the one de-rotated symbol lies beyond the boundary and in response to which one of the complex components of the one de-rotated symbol has a larger magnitude than the other, mapping the complex components of the quantized value for the one corresponding de-rotated symbol into an appropriate QAM symbol situated on the constellation boundary and generating said appropriate QAM symbol, in lieu of said quantized value or said one limit value, as said corresponding one of the first sliced values.

42. The method in claim 39 wherein said second converting step comprises the steps of:

squaring, in response to an incoming one of the de-rotated symbols, magnitudes of corresponding in-phase and quadrature components of said one de-rotated symbol and adding the magnitudes so squared together to form a resultant sum; and comparing said sum against a pre-defined acquisition slicing threshold value and generating, in the event the sum exceeds the acquisition slicing threshold value, values for the corresponding in-phase and quadrature components which represent a quadrant in which the de-rotated symbol exists within the pre-selected constellation, and, in the event the sum is less than the acquisition slicing threshold, zero values for the corresponding in-phase and quadrature components.

43. The method in claim 34 wherein said pre-selected constellation is one from a plurality of different pre-defined QAM constellations, and wherein said method further comprises the step of changing, in response to a QAM type signal, said pre-selected constellation from any one constellation in said group to any other constellation in said group.

44. In a communications receiver, a method for recovering a carrier signal from a received signal and for producing de-rotated symbols therefrom, said method comprising:

producing, in response to an incoming stream of symbols obtained from said received signal and to a reference carrier signal, a stream of de-rotated symbols;

first converting each one of said de-rotated symbols into a corresponding first sliced value so as to define a stream of first sliced values, wherein each of said first sliced values defines a corresponding symbol in a pre-selected constellation;

second converting ones of said de-rotated symbols into corresponding second sliced values, wherein each one of said second sliced values is specified by a pre-defined attribute of a corresponding one of said de-rotated symbols;

comparing, in response to a mode select signal, said each one of said de-rotated symbols to a corresponding one of selectively either said first or second sliced values in order to generate a phase error signal;

producing, in response to said stream of first sliced values and to said stream of de-rotated symbols, a mode error signal;

producing, in response to said mode error signal and a switching threshold value, said mode select signal;

varying said switching threshold value in response to variations in said de-rotated symbols; and generating said reference carrier in response to said phase error signal.

45. The method in claim 44 wherein said variations are changes in a carrier-to-noise (CNR) of either the stream of de-rotated symbols or said incoming stream of symbols.

46. The method in claim 45 wherein said varying step comprises the steps of:

estimating the CNR of said stream of de-rotated symbols or said incoming stream of symbols so as to produce a CNR estimate; and producing, in response to said CNR estimate, said switching threshold value.

47. The method in claim 46 wherein each one of said incoming and de-rotated symbols is a quadrature amplitude modulated (QAM) symbol with separate in-phase and quadrature components, each of said first and second sliced values is a complex value, and said reference carrier is a complex signal with separate in-phase and quadrature components.

48. The method in claim 47 wherein said CNR estimating step comprises the step of ascertaining whether said de-rotated symbols or said incoming stream of symbols or a magnitude squared value of either each of said de-rotated symbols or each symbol within said incoming stream of symbols falls within a group of pre-defined ranges and, in response thereto, providing the CNR estimate.

49. The method in claim 47 wherein said mode select signal specifies either an acquisition mode or a tracking mode and said mode select signal producing step comprises the step of setting said mode select signal to specify said acquisition or tracking mode whenever said mode error signal respectively exceeds or is less than said switching threshold value, and said comparing step further comprises the steps of:

selecting, in response to said mode select signal, the corresponding one of said first or second sliced values so as to form a selected sliced value; and comparing said selected sliced value against said each one de-rotated symbol to generate said phase error signal.

50. The method in claim 47 wherein said mode error signal producing step comprises the steps of:

ascertaining a difference between each one of said de-rotated symbols and each corresponding one of said first sliced values;

determining a magnitude squared value of said difference; and averaging said magnitude squared difference value so as to produce an averaged error energy value as said mode error signal.

51. The method in claim 47 wherein said first converting step separately comprises, for the in-phase and quadrature components, the steps of:

quantizing a corresponding component of each of said de-rotated symbols into one of a plurality of pre-defined quantized values; and comparing said one quantized value against pre-defined limit values and producing, in the event the quantized value has a magnitude less than the pre-defined limit values, said quantized value as a corresponding one of said first sliced values or, in the event the magnitude of the quantized value exceeds one of the limit values, the one limit value so exceeded as the corresponding one of said first sliced values.

52. The method in claim 51 further comprising the steps of:

determining, in response to said corresponding one de-rotated symbol, whether the corresponding one de-rotated symbol lies beyond a boundary of the pre-selected constellation; and in the event that the one de-rotated symbol lies beyond the boundary and in response to which one of the complex components of the one de-rotated symbol has a larger magnitude than the other, mapping the complex components of the quantized value for the one corresponding de-rotated symbol into an appropriate QAM symbol situated on the constellation boundary and generating said appropriate QAM symbol, in lieu of said quantized value or said one limit value, as said corresponding one of the first sliced values.

53. The method in claim 47 wherein said second converting step comprises the steps of:

squaring, in response to an incoming one of the de-rotated symbols, magnitudes of corresponding in-phase and quadrature components of said one de-rotated symbol and adding the magnitudes so squared together to form a resultant sum; and comparing said sum against a pre-defined acquisition slicing threshold value and generating, in the event the sum exceeds the acquisition slicing threshold value, values for the corresponding in-phase and quadrature components which represent a quadrant in which the de-rotated symbol exists within the pre-selected constellation, and, in the event the sum is less than the acquisition slicing threshold, zero values for the corresponding in-phase and quadrature components.

54. The method in claim 47 wherein said pre-selected constellation is one from a plurality of different pre-defined QAM constellations, and wherein said method further comprises the step of changing, in response to a QAM type signal, said pre-selected constellation from any one constellation in said group to any other constellation in said group.

55. Apparatus for estimating a carrier-to-noise ratio (CNR) of symbols recovered from a quadrature amplitude modulated (QAM) signal comprising:

means for ascertaining whether each of said symbols has a symbol magnitude that falls within any one of a group of pre-defined symbol magnitude ranges and, in response thereto, producing an output value indicative of a number of said symbols each of which has a symbol magnitude falling within any one of said ranges, said ranges being defined by corresponding symbol magnitude rings of a QAM constellation containing said symbols, said ascertaining means comprising:

means for generating a magnitude squared value of each of said symbols; and a multi-level histogram comparator for classifying whether the magnitude squared value of each of said symbols falls within any one of said pre-defined ranges and for producing the output value;

means for filtering the output value so as to generate a filtered value, said filtering means being a infinite impulse response filter, a finite impulse response filter or a periodically reset accumulator; and a pre-defined look-up table for mapping said filtered value into a CNR estimate.

56. The apparatus in claim 55 wherein for 16-QAM the ranges are, in integers: 0 to 4, and 8 to 12; or 0 to 8, and 16 to 24.

57. The apparatus in claim 55 wherein for 32-QAM, the ranges are, in integers: 0 to 4, and 8 to 12.

58. A method of estimating a carrier-to-noise ratio (CNR) of symbols recovered from a quadrature amplitude modulated (QAM) signal comprising the steps of:

ascertaining whether each of said symbols has a symbol magnitude that falls within any one of a group of pre-defined symbol magnitude ranges and, in response thereto, producing an output value indicative of a number of said symbols each of which has a symbol magnitude falling within any one of said ranges, said ranges being defined by corresponding symbol magnitude rings of a QAM constellation containing said symbols, said ascertaining step comprising the steps of:

generating a magnitude squared value of each of said symbols; and classifying, through a multi-level histogram comparator, whether the magnitude squared value of each of said symbols falls within any one of said pre-defined ranges and for producing the output value;

filtering the output value, through an infinite impulse response filter, a finite impulse response filter or a periodically reset accumulator, so as to generate a filtered value; and mapping, through a pre-defined look-up table, the filtered value into a CNR estimate.

59. The method in claim 58 wherein for 16-QAM the ranges are, in integers: 0 to 4, and 8 to 12; or 0 to 8, and 16 to 24.

60. The method in claim 58 wherein for 32-QAM, the ranges are, in integers: 0 to 4, and 8 to 12.

* * * * *